(12) United States Patent
Kumar

(10) Patent No.: US 10,540,971 B2
(45) Date of Patent: Jan. 21, 2020

(54) SYSTEM AND METHODS FOR IN-MEETING GROUP ASSISTANCE USING A VIRTUAL ASSISTANT

(71) Applicant: Blue Jeans Network, Inc., Mountain View, CA (US)

(72) Inventor: Navneet Kumar, Bengaluru (IN)

(73) Assignee: Blue Jeans Network, Inc., San Jose, CA (US)

(*) Notice: Subject to any disclaimer, the term of this patent is extended or adjusted under 35 U.S.C. 154(b) by 168 days.

(21) Appl. No.: 15/881,183

(22) Filed: Jan. 26, 2018

(65) Prior Publication Data

US 2019/0189117 A1    Jun. 20, 2019

(30) Foreign Application Priority Data

Dec. 15, 2017    (IN) .............................. 201711045242

(51) Int. Cl.

| | | |
|---|---|---|
| G10L 15/22 | (2006.01) | |
| G06F 16/332 | (2019.01) | |
| G10L 15/18 | (2013.01) | |
| G10L 25/51 | (2013.01) | |
| H04N 7/15 | (2006.01) | |

(52) U.S. Cl.
CPC .......... *G10L 15/22* (2013.01); *G06F 16/3329* (2019.01); *G10L 15/1815* (2013.01); *G10L 25/51* (2013.01); *H04N 7/15* (2013.01); *G10L 2015/223* (2013.01)

(58) Field of Classification Search
USPC .................. 704/235, 246, 247, 251, 252
See application file for complete search history.

(56) References Cited

U.S. PATENT DOCUMENTS

| | | | |
|---|---|---|---|
| 2014/0164532 A1 | 6/2014 | Lynch et al. | |
| 2014/0313282 A1* | 10/2014 | Ma ........................ | H04N 7/152 348/14.09 |
| 2016/0105641 A1* | 4/2016 | Periyannan .............. | H04N 7/15 348/14.08 |
| 2016/0165184 A1* | 6/2016 | Aaron ...................... | H04N 7/15 348/14.08 |
| 2017/0068423 A1 | 3/2017 | Napolitano et al. | |

FOREIGN PATENT DOCUMENTS

WO    2017/112813 A1    6/2017

OTHER PUBLICATIONS

International Search Report and Written Opinion dated Mar. 21, 2019, from the ISA/European Patent Office, for International Application No. PCT/US2018/065705 (filed Dec. 14, 2018), 14 pages.

* cited by examiner

*Primary Examiner* — Leonard Saint Cyr

(74) *Attorney, Agent, or Firm* — Ascenda Law Group, PC

(57) ABSTRACT

During a video conference meeting, a virtual assistant may provide in-meeting assistance responsive to verbalized group intent. The virtual assistant may automatically perform actions, such as recording notes, creating calendar events, and obtaining information derived from previous meetings, in response to the detected group intent. The virtual assistant may also provide pre-meeting assistance.

20 Claims, 11 Drawing Sheets

SYSTEM AND METHODS FOR IN-MEETING GROUP ASSISTANCE USING A VIRTUAL ASSISTANT

CROSS REFERENCE TO RELATED APPLICATIONS

This application claims the priority benefit of Indian Application No. 201711045242, filed on 15 Dec. 2017, the disclosure of which is incorporated herein by reference in its entirety.

FIELD OF THE INVENTION

The present invention is directed to approaches for providing in-meeting assistance by a virtual assistant during a teleconferencing call.

BACKGROUND

In a video conferencing system, typically a user tests his or her audio and video settings prior to joining the actual conference call in order to verify that the settings are acceptable and the call is likely to be completed without technical problems. This test can be performed using a parrot test call in which a server-side parrot implementation repeats the audio captured from the user's endpoint. However, the parrot test call requires that the user diagnose problems with the call and determine how to address the problems based on the user's perception of the test call. The user may be unaware of additional quality issues that could be improved with certain adjustments. Additionally, the user may not know how to address the problems the user identifies on his or her own.

During a video conference, meeting participants may present materials, take notes, and discuss issues giving rise to the need to follow up about issues and schedule future activities. Existing video conferencing services do not facilitate or automate these tasks, and existing technologies for automating such manual tasks fail to account for group preferences and ensuring group consensus across the meeting participants, such that an automated task is not merely responsive to an instruction from an individual user.

Accordingly, there is a need for approaches that address these problems, and the present application discloses embodiments that address aspects of this need.

SUMMARY

Embodiments are described for identifying and handling group intent in a video conference using a virtual agent. Such an agent may receive two or more upload audio streams generated at two or more endpoints of a video conferencing system, convert the two or more upload audio streams to a plurality of text-user statements; determine one or more user-intent names and a corresponding one or more user-context parameters based on the one or more text-user statements and create a plurality of utterance events based on the plurality of text-user statements, wherein the respective utterance events comprise the respective user-intent names. The process of detecting a group intent in the session may begin by identifying a match between a first utterance event of the plurality of utterance events and a target group intent having a predefined set of required-group-intent attributes, wherein the match is based on the utterance event satisfying a portion of the set of required-group-intent attributes, and wherein satisfying all of the required-group-intent attributes includes identifying a user intent shared by at least two participants in the video conference. The candidate detected group intent (target intent) may then be validated—i.e., determined to be present (valid) or not present (invalid)—by using a slot-filling approach, for example (1) searching the previous N utterance events for values that may satisfy the unsatisfied required-group-intent attributes (e.g., determining whether a component of a respective event of a first count of previous utterance events from the plurality of utterance events satisfies a first unsatisfied required-group-intent attribute, and parameterizing the unsatisfied required-group-intent attribute if so), (2) waiting for up to the next M utterance events, and searching them for values that may satisfy any remaining unsatisfied required-group-intent attributes (e.g., determining whether a component of a respective event of a second count of additional utterance events satisfies the first or a second unsatisfied required-group-intent attribute, and parameterizing the unsatisfied required-group-intent attribute if so), (3) fetching information to satisfy any remaining unsatisfied required-group-intent attributes from an integration service stack (e.g., formulating a responsive data query concerning the first, second, or a third unsatisfied required-group-intent attribute and providing the responsive data query to an integration service stack, wherein the integration service stack provides an application programming interface for a collection of constituent services), and (4) generating a prompt to request values that may satisfy any remaining unsatisfied required-group-intent attributes (e.g., formulating a responsive agent statement prompt concerning the first, second, third, or a fourth unsatisfied required-group-intent attribute; converting the responsive agent statement prompt to audio for playing at the one or more endpoints; determining whether a component of a respective event of a third count of additional utterance events satisfies the first, second, third, or fourth unsatisfied required-group-intent attribute, and parameterizing the unsatisfied required-group-intent attribute if so). Upon validation of the target group intent, the agent may cause a responsive action to be executed, wherein validation is achieved when all of the required-group-intent attributes are satisfied.

DETAILED DESCRIPTION

Figure 1:
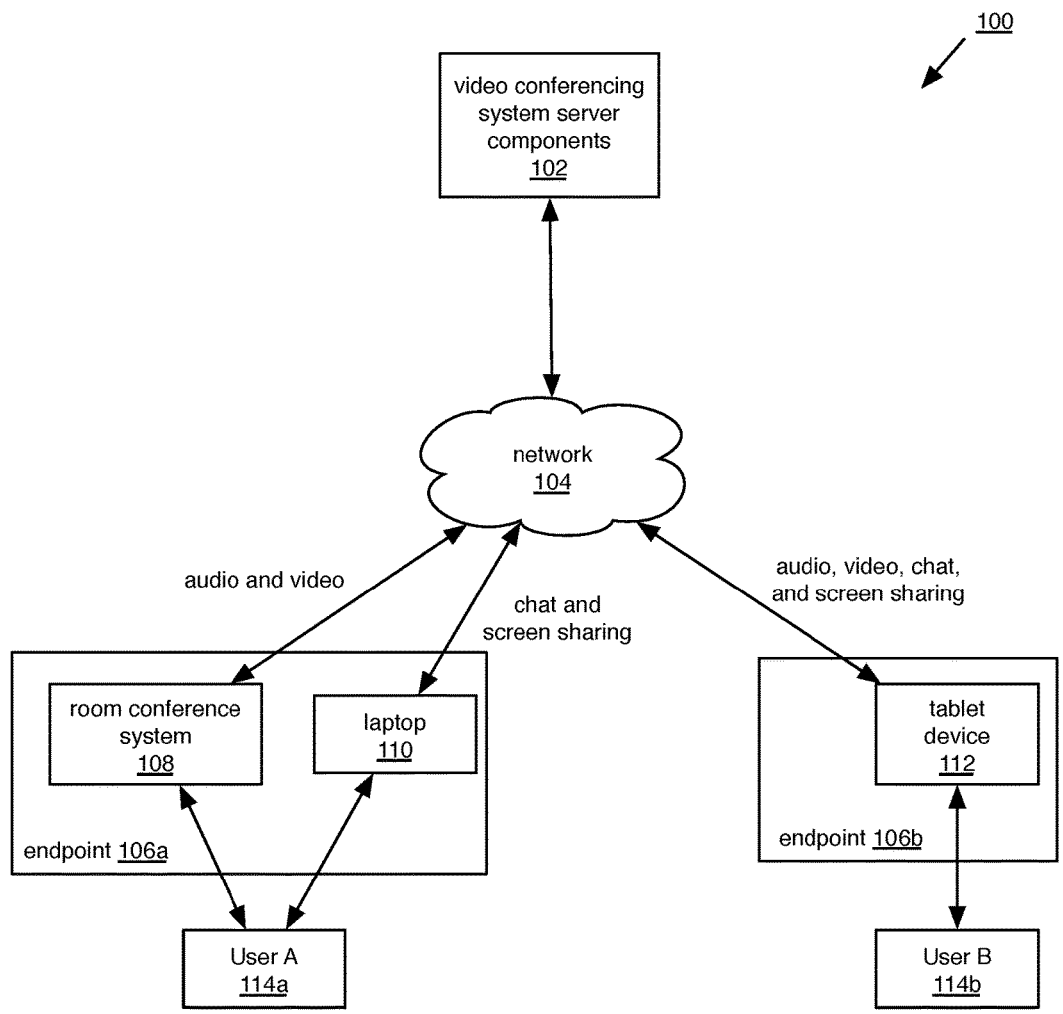
FIG. 1 depicts an exemplary video conferencing system in accordance with some embodiments of the invention.

Embodiments of apparatuses, computer systems, computer readable mediums, and methods for are described for deploying a virtual assistant as a means of providing in-meeting assistance and/or configuring a user's experience at an endpoint prior to a joining a video conference enabled by a video conference service. For example, a virtual assistant may proactively diagnose problems and potential problems with the endpoint in view of the imminent video conference, such as sound quality or limited bandwidth, and the virtual assistant may facilitate customizing the user experience in accordance with the user's preference, such as allowing the user to select a preferred audio input from a collection of possible options (e.g., permitting a choice between a laptop internal microphone versus a USB microphone).

A virtual assistant for providing in-meeting assistance may passively listen to an ongoing group conversation, and execute appropriate actions based on the group intent. Such a virtual assistant may take a variety of actions in connection with integrated services on behalf of the entire group, or on behalf of the meeting owner for the benefit of the entire group. Existing voice-enabled assistants are typically active (i.e., a user provides a verbal instruction to the assistant, the assistant responds, with additional instruction provided by the user as needed; if the user does not provide the initial verbal instruction to the assistant, the assistant will not take action) and are designed to interact with a single user at a time. As described herein, in the case of in-meeting assistance, a virtual assistant that listens to meeting audio in real-time and executes actions based on group intent or general consensus enables an improved virtual assistant experience, as the assistant derives the intent of the group, rather than an individual, and does not interrupt the meeting unless necessary, leading to a less disruptive assistant experience. Described herein are approaches for implementing a virtual assistant that acts responsive to group intent, as well as particular techniques for detecting group intent rather than just individual user intent. Domain-specific learning modules allowing the virtual assistant to identify domain-specific group-intents may be activated based on the nature of the meeting and organizational association of the meeting, or the organization associated with one or more of the participants in the session. For example, domain-specific learning modules may include a "scheduling" learning module, in which a virtual assistant may recognize intents such as intents to schedule a follow-up meeting, identifying meeting conflicts, re-scheduling a meeting, and canceling a meeting. Another example is an "action items" learning module, in which the virtual assistant may recognize conversational references to an action item, who the action item is assigned to, if the action item is completed, and the due date for the action item.

In the context of pre-meeting assistance, use of a virtual assistant for configuring the user's experience has the advantage of providing a user interface that may be an alternative to or an adjunct to a more conventional static series of selections from drop down lists and selectors. For example, a user may prefer a conversational approach enabled by the agent in configuring the user experience. Some users may benefit from being able to express selections and specifics regarding the configuration using natural language (typed or spoken), rather than having to recognize or use a particular vocabulary; this aspect may benefit less sophisticated users. Some users may have difficulty typing or using a mouse, and being able to verbally communicate with the agent eliminates or reduces the need for typing and using indicator user input devices such as a computer mouse. In another aspect, the virtual assistant as a user interface may be more extensible, because, for example, a multitude of specific configuration options may be made available via the agent, but there is no need to display or list these options (as might be necessary using a conventional user interface) because the options will not be presented to the user unless they are determined to be relevant. The agent may proactively identify and address problems, and may notify the user regarding actions taken or may, for example based on the contextual information about the user experience, request information from the user in order to better assess and address an issue. Additionally, because a user interface incorporating the agent permits multiple modes of communication, the agent may provide links or URLs for additional information that may help address a user's issue, which provides an advantage over interacting with a customer service agent using a single mode communication such as a phone call.

FIG. 1 depicts an exemplary video conferencing system 100, in accordance with some embodiments of the invention. The video conferencing system 100 may include multiple devices associated with single video conference endpoints 106 (e.g., endpoints 106a and 106b in FIG. 1), each device with its own set of capabilities. A user 114 (e.g., users 114a and 114b in FIG. 1) can join a video conference call with (i) a room conference system 108 that can be used for audio and video, (ii) a tablet device 112 or laptop 110 that can be used for screen sharing, and (iii) a smart phone that can be used for chat, all of these electronic devices forming a single video conference endpoint 106. In the embodiment shown in FIG. 1, room conference system 108 and laptop 110 are associated as a single endpoint 106a with User A (114a), and tablet device 112 forms a second endpoint 106b associated with User B (114b). For example, if a video conference involves a room conference system with limited capabilities (e.g., no chat possible), a mobile device (e.g., mobile phone, tablet computer, laptop computer, etc.) can be used to supplement the capabilities of the room conference system (e.g., provide chat). In certain embodiments, any endpoint may join the video conference by sending a request to join the conference to the system 100 (e.g., to a client-facing server of video conferencing system server components 102), e.g., from a client application at a client device.

Video conferencing system server components 102 may support a set of capabilities, such as media processing and compositing capabilities video conference feeds from and to the various endpoints 106. Network 104 may be a wide area network (WAN), the internet, a telecommunications network, a local area network (LAN), or the like. The server components 102 may support a variety of video conferencing feeds of audio, video, audio and video, and/or other media data streams from video conferencing participant endpoints to present a video conference. Endpoints 106 may incorporate any type of device, including, but not limited to: laptops, computers, smartphones, tablets, phones, audio and video conferencing system devices, video conference room systems (e.g., Blue Jeans Huddle, Blue Jeans Rooms, Blue Jeans Relay, or Polycom RealPresence Group 700), and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints. In some embodiments, server components 102 may include an application server (e.g., a user experience engine) that renders multimedia content including but not limited to the composite audio/video stream to each of the participants to the video conference via one or more user interfaces.

Figure 2:
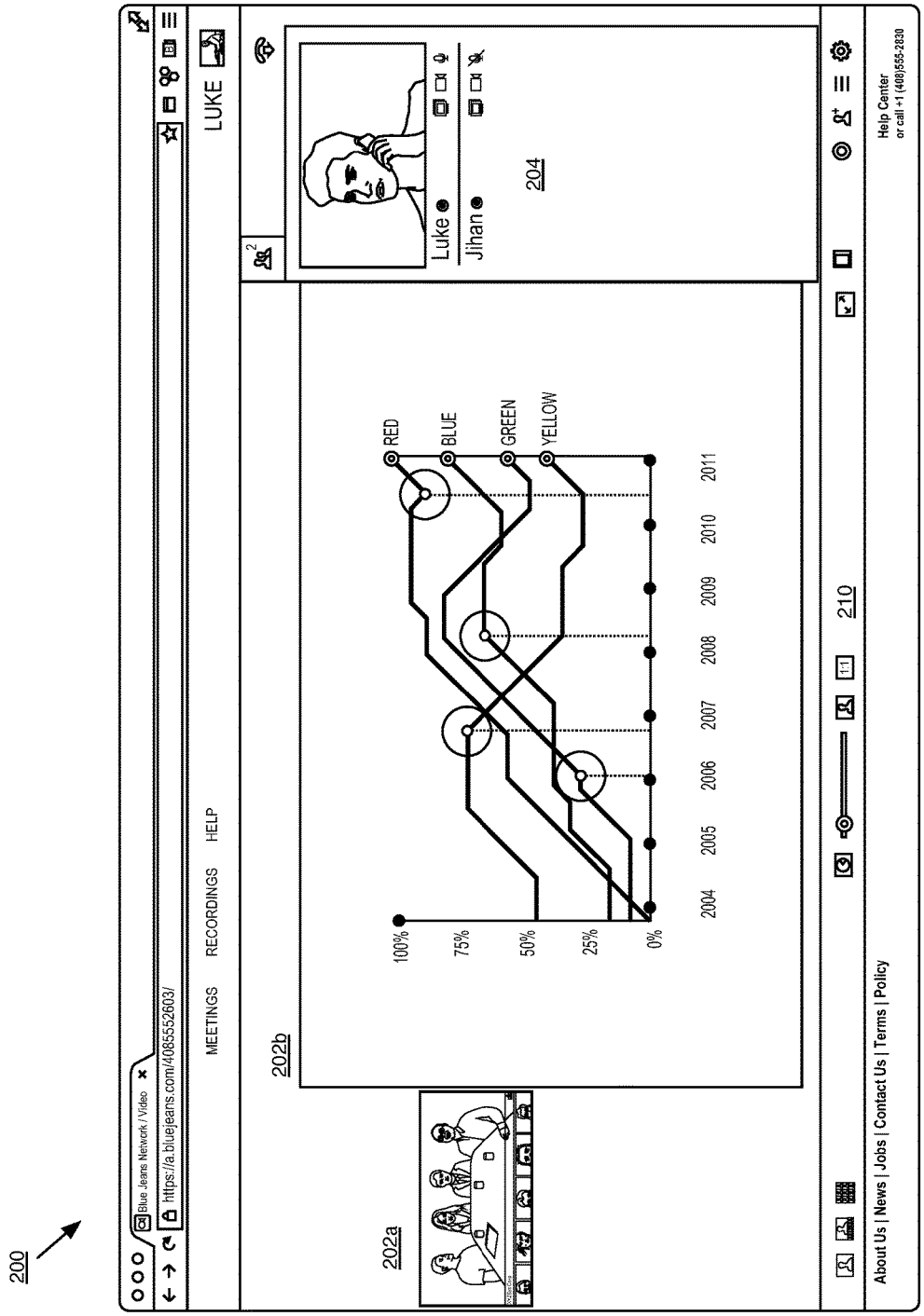
FIG. 2 shows an exemplary in-meeting user interface in accordance with some embodiments of the invention.

FIG. 2 shows an exemplary user interface 200 for participating in a teleconference at an endpoint 106, for example via a display at the endpoint. User interface 200 may be an HTML, or browser-renderable interface. User interface 200 may include one or more video streams 202—for example, video stream 202a, showing a feed from a camera aimed at participants at an endpoint (such as via room system 108 at endpoint 106a), and video stream 202b, showing a "screen sharing" stream (e.g., a stream mirroring the display of a device at an endpoint such as a laptop 110, in a circumstance where user interface 200 is presented to a user at a different endpoint (such as User B 114b at endpoint 106b). User interface 200 may additionally include a panel 204 indicating information about participants to the video conference, and a user interface control 210 for setting the appearance of the video stream layout, such as setting the relative sizes as displayed of categories of video streams (as shown in FIG. 2, a presentation category of stream (e.g., stream 202b) is selected to occupy a larger amount of space within the user interface relative to a participant-view category (e.g., stream 202a)).

Figure 3:
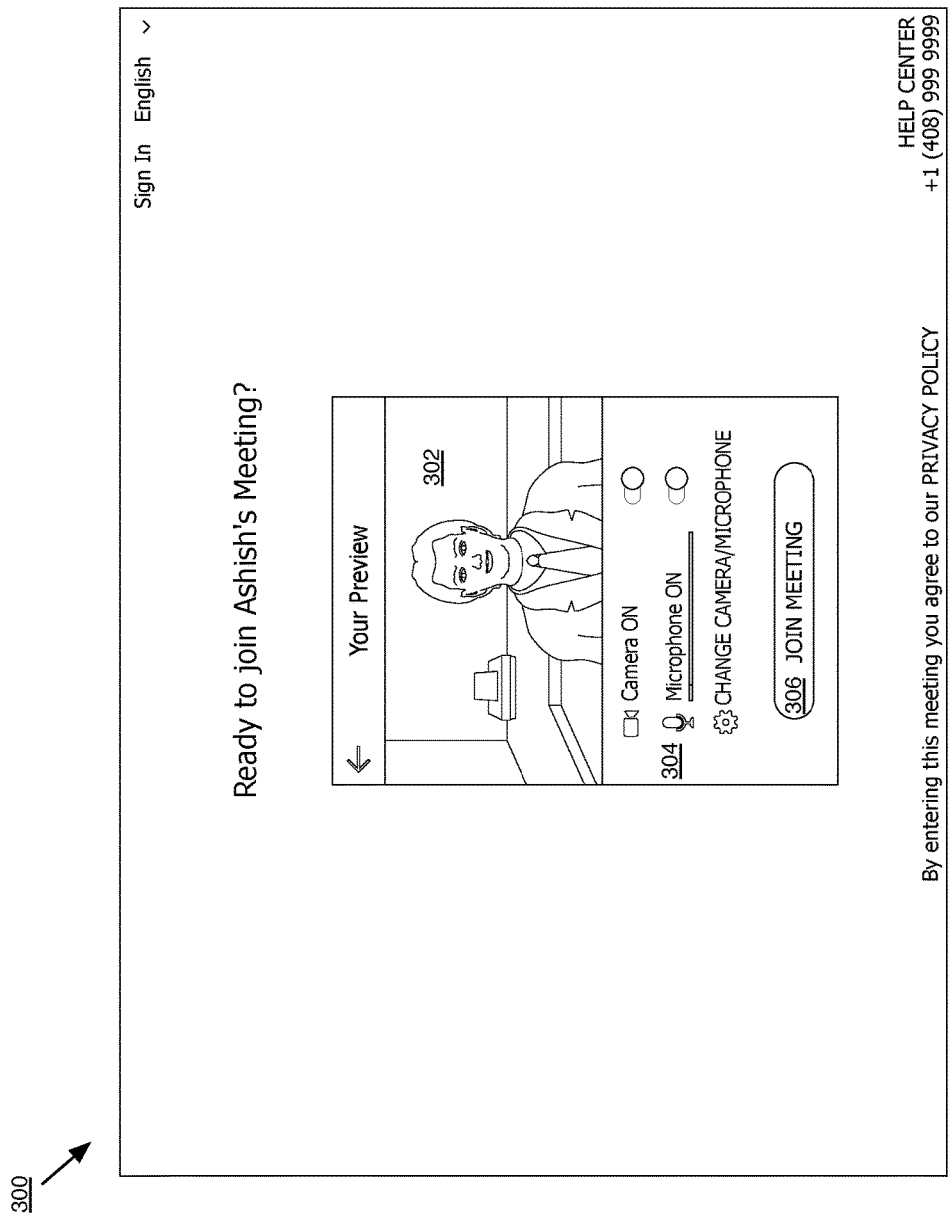
FIG. 3 shows an exemplary pre-meeting user interface in accordance with some embodiments of the invention.

FIG. 3 shows an exemplary pre-meeting user interface 300 for configuring a user's experience at an endpoint prior to a joining a video conference. Pre-meeting user interface 300 may include, for example, a preview video stream 302, showing the user at the endpoint the feed from the camera pointed at the user before joining a conference and sharing that feed with the other video conference participants (e.g., the feed corresponding to an upload video feed such as stream 202a shown at other endpoints during the imminent video conference). In certain embodiments, the pre-meeting user interface may additionally include controls 304 for configuring settings, such as whether the local camera is on (so that it will be shared in the video conference), and whether the microphone is on or muted. The controls may indicate, for example, the level of sound picked up by the microphone (e.g., by displaying a dynamically changing bar, where the bar length corresponds to the magnitude of the currently detected sound). The user interface may additionally provide an option to change the input device (e.g., to change the camera or the microphone—e.g., allowing the user to select from two or more options for the input devices, such as external USB cameras and microphones, or internal input devices built into a laptop, or components of a room system, and the like). The user interface may provide a control 306 for joining the endpoint to the meeting. In certain embodiments, user interface 300 is one of a series of pre-meeting user interfaces presenting different configuration options. For example, prior to or after interacting with user interface 300, the user may be presented with options to select an audio option for the video conference (e.g., to use the built-in computer audio, or separately dial in to the video conference using a phone for providing the user's audio stream). Such user interface options may also include a control for saving the settings for use with the next video conference.

Figure 4:
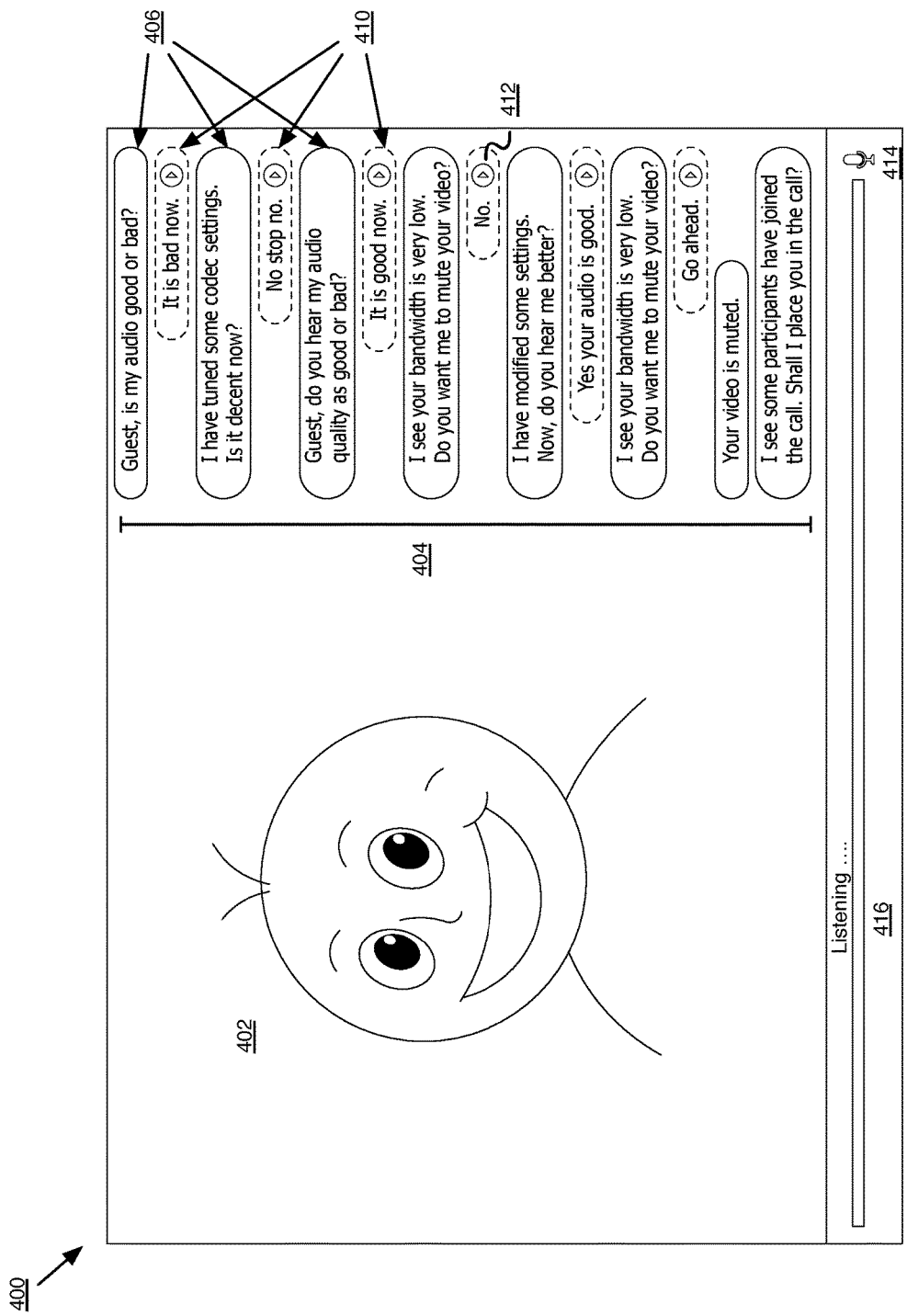
FIG. 4 shows an exemplary pre-meeting user interface in accordance with some embodiments of the invention.

FIG. 4 shows an exemplary pre-meeting user interface 400, the interface featuring a virtual assistant for configuring a user's experience at an endpoint prior to a joining a video conference. In certain embodiments, user interface 400 includes an animated agent representation 402 for visually interacting with the user. User interface 400 may be associated with automatically generated audio corresponding to the text prompts and responses generated by the agent (i.e., the agent's voice). Such an agent representation 402 may depict a human or animal face, and use lip sync techniques to generate a sequence of frames depicting the agent's face and corresponding to the words of an audio stream (i.e., corresponding to the agent's voice). The agent representation may additionally react to the user by, for example, directing the animated gaze of the representation toward the estimated location of the user's face using image processing techniques to locate the user's face in a preview video stream 302, and basing the representation's simulated eye contact on that location. In another example, the agent representation may nod when responding in the affirmative, and shake its head when responding in the negative. The agent representation may additionally show expressions such as a smile (e.g., when greeting the user or agreeing with the user) or a frown (e.g., when communicating information about a problem with the video conference). The agent representation's reactions may be achieved using a face/head detection/tracking library. In certain embodiments, the library may use Voila Jones-type algorithms or a Continuously Adaptive Mean Shift Algorithm (CamShift) for face detection, and in certain embodiments a smoothing algorithm to reduce jittering of the face tracking. The face tracking library may report the position of the head or face with respect to the camera used to track the face—e.g., x: position of the head in cm to the right of the camera, y: position of the head in cm above the camera, and z: position of the head in cm representing the distance from the camera. These coordinates may be translated to derive the corresponding coordinate on the display of the endpoint device, based on the screen width for the display, to position the agent representation's eye/pupil or entire head, if the head is moving or nodding in accord with the user on camera. The positioning of the pupil may be modulated with a dampening factor so that the eye or head movement looks realistic if the user is moving very fast, or if the movement is edge to edge.

In certain embodiments, instead of an animated human agent, the agent representation may be a depiction of a sound waveform that alters its shape based on, for example, the pitch and volume of the agent's voice.

User interface 400 may additionally present an agent chat transcript 404. The chat transcript 404 is the text transcript of the conversation between the agent and the user. For example, it may display agent statements 406 and user statements 410 in chronological or reverse chronological order. In certain embodiments, agent statements 406 may be represented differently from user statements 410; for example, the types of statements may be displayed using different colors, text styles, or in differently shaped "speech bubbles" corresponding to the statement type (e.g., agent or user), or with statement alignment (e.g., as shown, agent statements 406 are arranged at the left of the chat transcript 404, and user statements 410 are arranged at the right of transcript 404). In certain embodiments, agent statements including prompts for information (questions) are displayed differently from agent statements that report information and are not prompts. In certain embodiments, certain statement in the chat transcript 404 are associated with replay buttons 412 that, upon selection, play the audio associated with the text statement. In certain embodiments, one or both of an agent representation 402 or agent chat transcript 404 may be displayed in connection with all or some of the elements of user interface 300—for example, agent representation 402 and/or chat transcript 404 may be displayed in a panel adjacent to preview video stream 302. User interface 400 may additionally include a mute control 414 to mute the agent audio and/or a status indicator 416 to show that the agent is listening (receiving/recording user audio) or thinking (processing and obtaining a reaction to the user audio).

Figure 5:
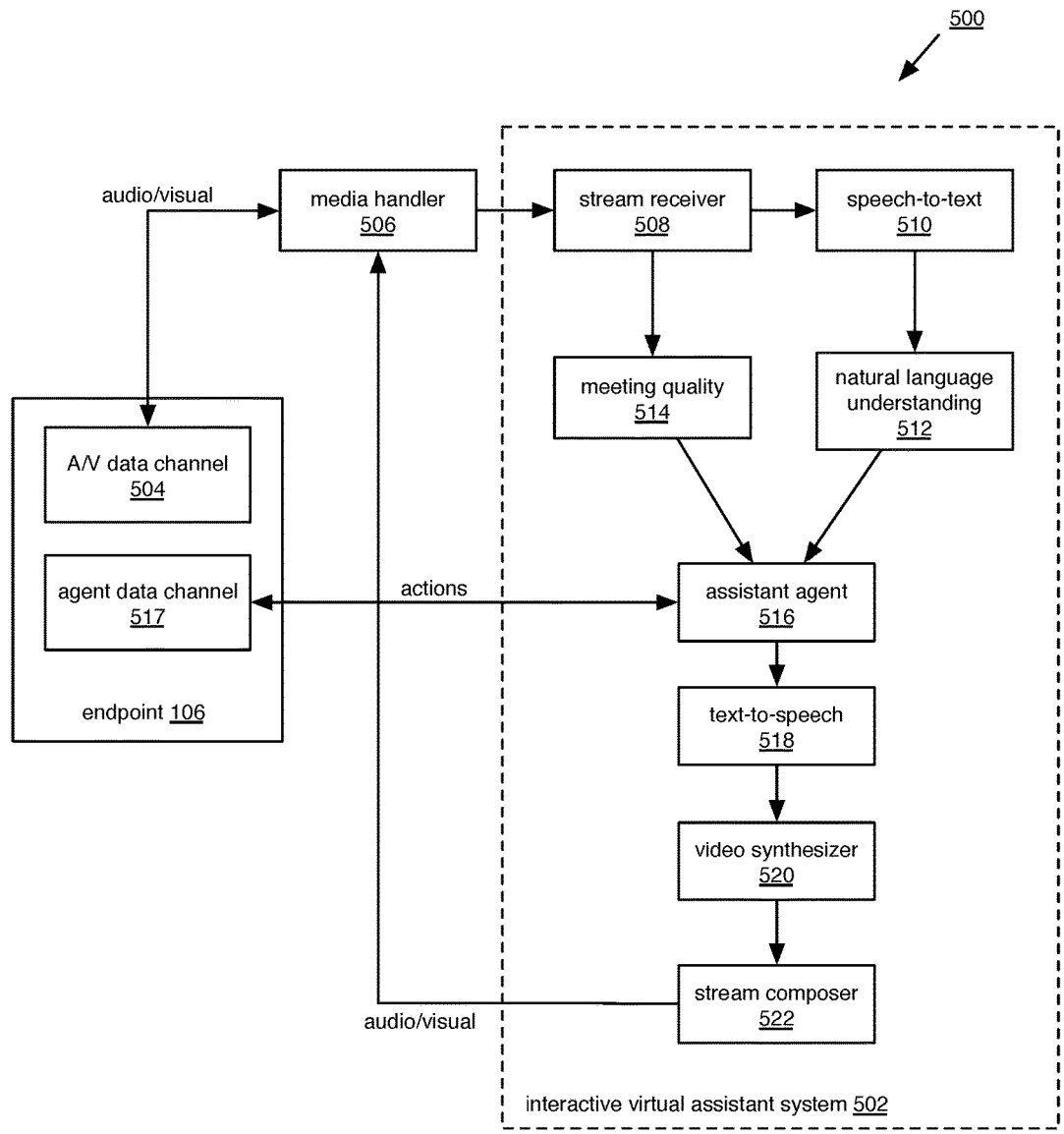
FIG. 5 shows exemplary components of a video conferencing system including an interactive virtual assistant system in accordance with some embodiments of the invention.

FIG. 5 shows components of an exemplary video conferencing system 500 including an interactive virtual assistant system 502. In certain embodiments, a session is created when a conversation is started between the interactive virtual assistant system 502 and a user at the endpoint 106. The session may be maintained until the end of the conversation.

The components of system 500 include media handler 506, which receives audio and video streams from an audio/visual data channel 504 at endpoint 106, and provides composited media streams for display at endpoint 106. For example, A/V data channel 504 may be a client application at endpoint 106 providing the video stream from a camera at endpoint 106 and the audio stream from a microphone at the endpoint, and receiving composited audio and video streams from media handler 506 for display at the endpoint, e.g., in pre-meeting user interfaces 300 or 400. Media handler 506 mediates outgoing and incoming audio/visual streams between the endpoint 106 and the interactive virtual assistant system 502.

Incoming audio and video upload streams are provided to stream receiver 508 of the interactive virtual assistant system 502. Stream receiver 508 provides or pushes audio and video streams to particular components of system 502 for further processing and analysis. For example, stream receiver 508 may push the audio stream to speech-to-text converter 510, and the video and/or audio stream to meeting quality component 514. Speech-to-text converter 510 takes an audio stream and generates a corresponding text transcript. For example, such a conversion may be performed with a local speech recognition library or a cloud service provider (e.g., Google Cloud Speech API, Amazon Polly, Microsoft Azure Speech API). In certain embodiments, the transcript is a text stream or a string. In certain embodiments, the interactive virtual assistant system is provided with additional information, such as expected terms that may appear in the transcript, or a geographic location or user input to indicate the language of the speech in the audio stream, in order to simplify and increase the accuracy of the conversion by speech-to-text converter 510. In certain embodiments, the transcript may be translated to a different language prior to further processing—for example, the Swedish-language transcript of the user's audio stream may be translated to English text prior to the transcript being provided to natural language understanding processor 512. In certain embodiments, one or more segments of the transcript are associated with transcription confidence values, and only confidence values greater than a threshold confidence (e.g., 0.5) are provided to or used by natural language understanding processor 512. In certain embodiments, the user may type his or her statements at the endpoint, and this text may be directly provided to the interactive virtual assistant system 502 as user statements 410 without the need for the use of the speech-to-text converter 510.

Natural language understanding (NLU) processor 512 processes the transcript using natural language approaches to determine the user's intent based on the transcript made up of user statements, within the context of the conversation session. The user statements are unstructured in that the user is not required to express his or her intent using any particular phrasing. In certain embodiments, NLU processor 512 uses descriptions for the context of the user's statements (e.g., user utterances) in the transcript as well as grammar and machine-learning techniques to determine the intent and any relevant entities in the user statements. As used herein, the intent represents a mapping between a user's utterance in natural language to a pre-defined structured purpose (e.g., to communicate the user's opinion that sound quality is good, sound quality is bad, or a desire to select a microphone for use in the video conference). An intent name is an identifier for the user intent. There may be a pre-defined list of potential or target intents that may be identified in the user statements by NLU processor 512. Entities are extracted parameter values from user utterances which may be required to be present to find that an intent is implicated by the user utterance. For example, if the intent is to select a microphone for use during the video conference, the relevant entity may be a specification of the microphone (e.g., an internal microphone). An intent may be associated with a predefined set of context parameters.

In certain embodiments, NLU processor 512 may have access to a range of parameters concerning the context associated with the user, and may identify the context data that is relevant to the user's intent. Context parameters represent the current context of a user's statements, and may be used to pass on information from an external source, or a previous user or agent statement (e.g., to manage conversation flow). Context parameters may be used for differentiating phrases which can have a different meaning depending on the topic of conversation, the user's preference, or the state of the user interface. For example, for a user utterance comprising "Mute my video," the intent of the statement is "update_media", with entities "media_type"=VIDEO, and "media_action"=MUTE. Context parameters may be set based on a user profile containing user preferences and/or previously used settings by the same user. Context parameters may be extracted as entities from user statements. Context parameters may additionally be set based on entities in an agent statement, such as entities in an agent prompt, or entities that are added to the current context parameters when such an agent statement is generated. A detected intent may activate, deactivate, or renew a content parameter as current or active.

Each detected user intent may be associated with a confidence score and may additionally include one or more relevant context objects, where the context object is associated with a name and one or more parameters that describe the context. Additionally, a given context parameter may be associated with a lifespan which may be expressed in terms of time (e.g., next ten minutes) or number of requests (e.g., next ten requests). In certain embodiments, the lifespan may be the entire duration of the session. After the lifespan has elapsed, the associated context parameter will no longer be considered part of the current or active context for user statements and potential intents.

An example of the output, containing a detected user intent from natural language understanding processor 512 is:

```
{
    "sessionId": "356a03c7-569f",
    "textQuery": "I can hear you pretty clear as well",
```

-continued

```
    "intentName": "sound_check_answer_yes",
    "confidence": 0.9,
    "contexts": [
        {
            "name": "sound_quality",
            "parameters": {
                "selected_device": "InBuilt-Microphone"
            },
            "lifespan": 2
        },
        {
            "name": "meeting_quality",
            "parameters": {
                "username": "Navneet"
            },
            "lifespan": 10
        }
    ]
}
```

The interactive virtual assistant system 502 may include a meeting quality analyzer 514. There are several media streams that may be analyzed by the meeting quality analyzer 514. These include the video and audio streams transmitted from the endpoint 106 to the video conferencing system server components 102 ("upload streams"—i.e., the streams based on media capture at the endpoint, including, for example, video of the user or audio of the user's speech), and the video and audio streams transmitted from components 102 to endpoint 106 ("download streams"). In certain embodiments, upload streams may be analyzed based on the video and audio streams transmitted from the endpoint 106 to the virtual assistant system 502, and download streams may be measured based on the video and audio streams transmitted from the virtual assistant system 502 to the endpoint 106 (e.g., where the video conferencing system server components 102 comprise the virtual assistant system 502). In certain embodiments, only video streams are evaluated by the meeting quality analyzer. In certain embodiments, test data is generated and transmitted to evaluate the quality of a corresponding stream during a video conference. The meeting quality analyzer may determine network quality meeting parameters such as bandwidth, jitter, frame rate, and/or packet loss for one or more streams. In certain embodiments, this determination is an ongoing analysis and the values of the network quality meeting parameters are updated on a periodic basis during the session. In certain embodiments, the meeting quality analyzer may access or retrieve meeting quality parameters determined by other components of interactive virtual assistant system 502 or by a client application of endpoint 106. In certain embodiments, some or all meeting quality parameters used by the agent 516 are determined only by the meeting quality analyzer 514.

In certain embodiments, the meeting quality analyzer 514 uses image analysis to evaluate the quality of the video stream, for example, to determine whether the user is depicted in the video stream. By using face detection, the meeting quality analyzer can determine if the user is visible within the video stream, and if the user is centered within the field of view of the camera generating the video stream, or only partially in view. In another example, the analyzer 514 may determine the light level of the video stream, in order to facilitate a determination of whether the light level is unacceptably low. For example, the light level can be determined by analyzing a histogram of pixel intensity. If the histogram reveals a low intensity region, the video may be determined to be a low-light video stream, which can be reported to the user or can be automatically improved by applying contrast enhancement techniques or filters. Network quality meeting parameters and other meeting parameters including information about user visibility and location within the frame of the video stream may be saved as metadata associated with the session.

The assistant agent 516 is provided with the output of the meeting quality analyzer 514 and the natural language understanding processor 512, and can use this information to address meeting quality issues and customize the user experience based on user feedback. The assistant agent 516 receives as input structured conversational data from the natural language understanding processor 512 (e.g., detected user intent objects with associated context) and meeting parameters from the meeting quality analyzer 514. Based on analysis of this input, the agent 516 may generate a conversational textual reply (i.e., an agent statement 406) and, in certain circumstances, an action. As used herein, an action is an instruction to a client application at the endpoint 106, or an instruction to a server-side service (e.g., in which the subject action is executed at video conferencing system server components 102). (In certain embodiments, the substance of the action is reflected in the agent statement.) In certain embodiments, an action corresponds to a particular intent, such that upon detection of the intent in one or more user statements, the corresponding action will be generated. The assistant agent 516 provides actions to the client application via the agent data channel 517. Agent data channel 517 is co-located with the client application at the endpoint and establishes a socket connection to the agent 516 for two-way data transfer. Data channel 517 provides meeting quality parameters (e.g., bandwidth, packet loss, jitter) to the agent 516, and the same data channel is used by the agent to push actions (e.g., mute video, increase volume, select device: <value>) to the endpoint. In certain embodiments, meeting quality parameters are calculated at the endpoint 106 or at server components 102, or some mixture of both. For example, jitter, bandwidth, and packet loss can be calculated at either or both the client side (endpoint) or server side. Certain processor-intensive calculations, such as a calculation of lighting conditions, should be determined at the server side.

The assistant agent may diagnose issues by, for example, (1) detecting a meeting quality parameter value that is out of range, or (2) by issuing an agent statement 406 that is a prompt for information from the user; based on responsive user information, the agent may determine that an issue exists. Certain agent prompts may be issued in all sessions, and certain other agent prompts may be issued only in certain circumstances, such as when user settings conveyed via the agent data channel 517 or a meeting quality parameter meet certain conditions. For example, if the upload and download bandwidth (meeting quality parameters) are found to be below 512 kbps (as provided by the meeting quality analyzer 514), the agent may issue a prompt asking to mute the video. More specific examples and categories of diagnosis by the assistant agent are provided below.

The assistant agent may handle issues related to video quality assessment and diagnosis. In a video quality assessment, the agent 516 may first determine if any of the meeting quality parameter values is outside of an acceptable range, and if so, the agent may generate an agent statement 406 containing a notification of the unacceptable parameter value. If the issue implicated by the parameter can be addressed without any adjustment by the user, the agent 516 will provide an action instructing the client application to make the appropriate adjustment (e.g., (1) if the endpoint camera interface supports panning and zooming, and the user's face is not in the center of the screen (e.g., as determined by meeting quality analyzer 514), the agent may generate an action causing the endpoint to focus the camera on the user; or (2) if the available bandwidth as provided by meeting quality analyzer is within a specified range for a moderate bandwidth, the agent may instruct the video conferencing system to change the upload and/or download video stream to a lower resolution; below the range, the agent may generate an agent statement asking if the user wishes to turn off video). If the issue requires action by the user (for example, the meeting quality analyzer 514 face detection parameter indicates the user is only partly visible within the frame of the video stream), the agent may generate an agent statement 406 instructing the user to take action (e.g., "Your face is only partly visible in the video; please move so that you are visible."). In certain embodiments, if the issue remains while a lifespan for the issue has not elapsed (e.g., a lifespan for a corresponding context parameter), following a delay the agent will generate another agent statement 406 requesting that the user move until the user's face is visible. If the agent detects a user intent indicating that the user doesn't care about the issue, the agent will close the issue (i.e., determine that the issue does not exist or has been resolved and there is no need to attempt to diagnose it). In other examples, the video quality issue may be raised by the user, as represented by a user intent such as a desire to review a preview video stream 302, or in certain embodiments, the agent will always cause a preview video stream to be presented to the user, and may handle user intent concerning adjustments to the preview video stream. In other examples, the agent will handle user intents concerning video quality such as an intent to communicate that video quality is poor (e.g., expressed in user utterances such as "My preview video looks pixelated" or "My video resolution is very low") by, for example, (1) issuing an agent prompt asking the user if the video should be muted/turned off, (2) automatically changing the network for the video streams to a network having higher bandwidth, if such an alternative network path is available, or (3) issuing an agent prompt asking the user if it is ok to switch to an alternative camera at the endpoint.

The assistant agent 516 may diagnose and address the category of audio quality issues. For example, in certain embodiments, for all sessions, the assistant agent will issue an agent statement 406 that is a prompt requesting the user's comment on incoming audio quality (e.g., "[User Name], is my audio quality good or bad? Or [UserName], Can you hear me well?"). If a user statement 410 following the agent statement is determined, by the natural language processor 512, to implicate an intent that audio quality is good, the agent will close this potential issue. If an intent implicating poor audio quality is identified, the agent may generate a responsive action (e.g., select a different audio codec from the one currently used for the download audio stream) and issue another agent statement prompt to ask if the audio quality is better, or the agent may generate a prompt asking whether the user would like to switch to a different peripheral audio device (e.g., headphones having a microphone rather than the internal microphone for an endpoint device). If an additional prompt is issued, the agent may continue to monitor user statements 410 for an intent responsive to the additional prompt, or until a lifespan for the issue has been exceeded. In certain embodiments, audio quality issues will be diagnosed by the agent only if a precondition is met, such as a lack of a profile for the user indicating a previously used combination of profiles in a video conference that did not lead to any problems with the video conference; if such a profile exists, the agent may not execute a diagnosis of audio problems or a diagnosis of other problems, unless a user intent in an utterance indicates the user would like to revisit the configuration for the video conference. In certain embodiments, audio quality issues will be diagnosed only if an out of range meeting quality parameter indicates such a diagnosis is warranted. In certain embodiments, the agent may issue a prompt regarding the user's preferred volume for the download audio stream and whether or not the user would like to mute his or her upload audio stream for the video conference. Upon detecting a user intent responsive to the preferred volume or muting state, the agent will generate an appropriate responsive action (e.g., increase or decrease the volume of the download audio stream; mute or un-mute the upload audio stream prior to joining the user to the video conference).

The assistant agent 516 may diagnose and address the category of network quality issues. For example, if a network quality meeting parameter is out of range, the agent may determine that there is a network quality issue concerning that parameter and automatically generate an action to address the issue. In certain embodiments, the agent may generate an agent statement prompt to obtain more information in order to address the issue (e.g., using approaches similar to the ones described above in connection with audio quality issues). For example, if bandwidth is low, then the agent may propose turning off the video stream, and generate a corresponding action (i.e., instructing the endpoint device client to turn off the video stream) if the user's intent indicates the user agrees, or the agent may propose lowering the bandwidth of the video stream (upload and/or download). If jitter is high, then the agent may generate an action causing the endpoint client application to adjust the buffer memory, as a higher buffer memory can tolerate a high jitter for a smooth video experience. If packet loss is high (e.g., 10%-19%), then the agent may generate an action causing the endpoint connection to the video conference service to be reconnected; if packet loss is very high (e.g., >20%), the agent may generate an agent statement suggesting that the user reconnect to the video conferencing service using WiFi or Ethernet (e.g., as opposed to connecting over a cellular network connection).

The assistant agent 516 may diagnose and address the category of meeting connection issues. For example, if the user's intent indicates the user is ready to join the video conference, the agent may generate an action and agent statement notification regarding joining the user to the video conference. The agent 516 may be notified by a middleware service of the video conferencing system having a participant roster list that one or more participants have already joined the video conference, and may generate a corresponding agent statement 406 for notifying the user.

In certain embodiments, the assistant agent 516 may save a user's preferences in a profile in a database of system server components 102 for use during the next session involving that user. For example, the agent may record the audio peripheral device, video peripheral device, volume level, and video mute state for the user in the profile.

The agent statements 406 generated by assistant agent 516 may be provided to text-to-speech converter 518. Text-to-speech converter 518 converts text (i.e., agent statements 406) to audio data containing the corresponding speech. This conversion may be performed using a cloud service such as IBM Watson text-to-speech, or using a local text-to-speech library.

The audio speech output from text-to-speech converter 518 and the agent statements 406 may be provided to video synthesizer 520 to generate the frames of the video for display at the endpoint (e.g., via user interface 400). For example, the video synthesizer 520 may generate an agent representation 402 with animation responsive to the audio speech output from converter 518 (e.g., if lip sync techniques are used to map the representation's lip movements to the speech or to generate expressions at appropriate times in the speech, or if the agent representation 402 is a waveform corresponding to the pitch and volume of the audio speech). Additionally, the agent representation 402 may be generated so as to be responsive to the location of the user's face in the camera, and synthesizer 520 may obtain the relevant face or eye location parameters directly or indirectly from the meeting quality analyzer 514.

The video frames generated by video synthesizer 520 and the audio speech output from converter 518 may be provided to stream composer 522. Composer 522 composes the video data from the synthesizer 520 and the audio data from converter 518 into audio and video streams, which are provided to the media handler 506, to be sent to the endpoint 106. In certain embodiments, e.g., in connection with diagnosing a video quality issue, a preview video stream 302 may be included in the video stream generated by composer 522 in addition to or in lieu of an agent representation 402.

In certain embodiments, the components of system 502 enable real-time interaction with the virtual assistant via the endpoint 106. For example, the user may provide spoken user statements, and hear responsive spoken agent statements and view an animated agent representation 402 without an unnatural lag time—for example, responses will be communicated via a download audio and video stream within one or two seconds or less. This real-time interaction is enabled by, in certain embodiments, performing text to speech and speech to text conversions local to the endpoint. In certain embodiments, real-time communication and minimal lag time is achieved using video synthesis executed local to the endpoint device, because the video frames do not need to be downloaded from a remote server, such as system server components 102.

Figure 6:
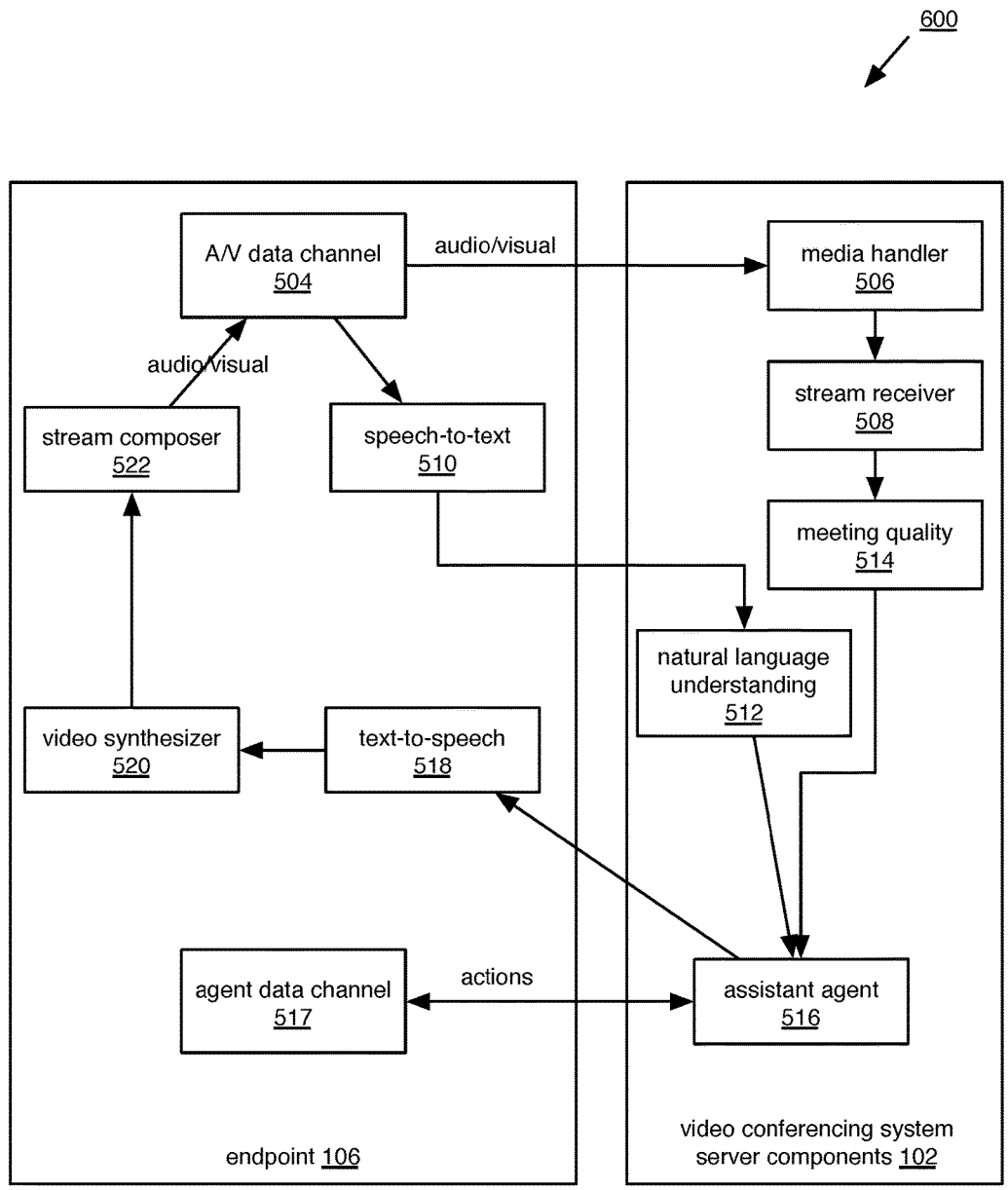
FIG. 6 shows exemplary components of a video conferencing system including an interactive virtual assistant system in accordance with some embodiments of the invention.

The following is an exemplary chat transcript 404 representing a real-time audio conversation between the interactive virtual assistant and the user:
IVA: Welcome Navneet, let me check your settings before you join the meeting
User: Sure
IVA: I can hear you clearly. I hope you can hear me as well
User: I can hear you pretty clear as well
IVA: Navneet, I see your bandwidth is very low. Do you want me to turn off your video for better experience
User: Please go ahead
IVA: Happy to help. I am placing you in the meeting with video turned off. Thanks In certain embodiments, media handler 506 and interactive virtual assistant system 502 are remote from endpoint 106 (e.g., 506 and 502 may execute at video conferencing system server components 102 of FIG. 1). In certain embodiments, certain components of interactive virtual assistant system 502 may be local to endpoint 106 (e.g., as shown in FIG. 6), in order to minimize latency. In certain embodiments, the assistant agent 516 and the natural language processor 512 are implemented local to the endpoint.

Figure 7:
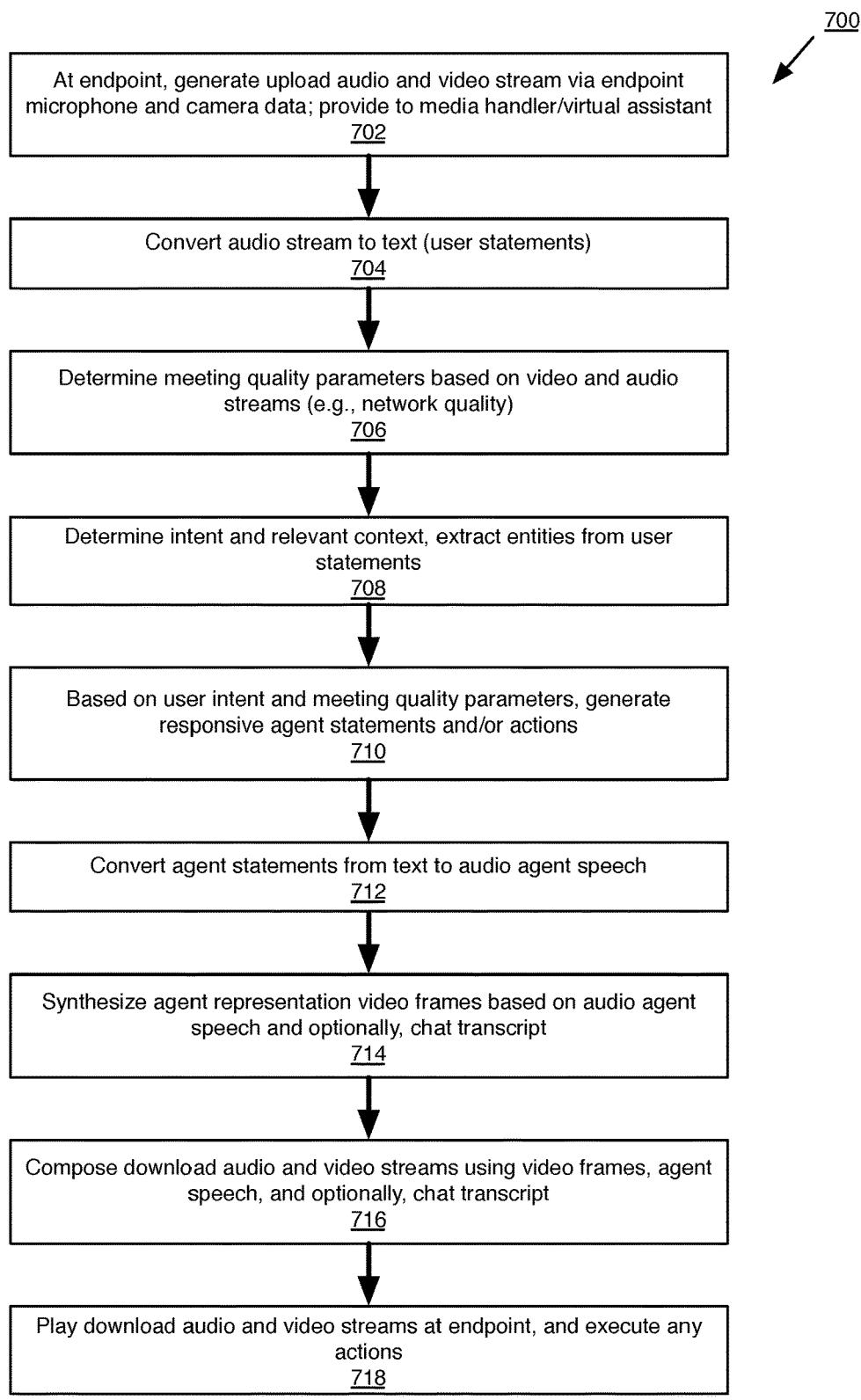
FIG. 7 shows a flow chart for an exemplary process concerning customizing a video conferencing user experience using a virtual assistant in accordance with some embodiments of the invention.

FIG. 7 shows a flow chart for an exemplary process 700 concerning customizing a video conferencing user experience using a virtual assistant. At endpoint 106, a local camera and microphone are used to generate data for upload video and audio streams, e.g. showing video of the user and representing audio that could include the user's speech (702). In certain embodiments, instead of providing user statements using speech via a microphone, the user may type the user statements via an input device such as a keyboard. Typed user statements may be used as described in step 708 below. The audio and video streams are provided to the interactive virtual assistant system 502. The system 502 converts the audio stream to text that may contain user statements 410, at, e.g., speech-to-text converter 510 (704). Video and/or audio streams representing transmission between the endpoint and a video conferencing server (e.g., video conferencing system server components 102) may additionally be analyzed, e.g. at an endpoint client application or by a server-based meeting quality analyzer 514 to determine meeting quality parameters such as bandwidth, jitter, frame rate, and/or packet loss; these parameters may be used to diagnose potential quality issues during an imminent video conference (706). The user statements from step 704 are analyzed, e.g., by natural language understanding processor 512, to determine any user intents represented in the user statements, and to identify descriptions of the relevant context for the intent and entities that may be represented in the statements (708). Based on user intent and meeting quality parameters, issues in the categories of video quality, audio quality, network quality, and meeting connection are identified, and responsive agent statements and/or actions are generated, e.g., by assistant agent 516 (710). Actions are provided to the endpoint for execution. Any responsive agent statements are converted from text to audio to represent agent speech, e.g., by text-to-speech converter 518 (712). Video frames corresponding to a visual agent representation 402 may be generated based on the agent speech audio from step 712, using, for example, video synthesizer 520 (714). In certain embodiments, the video frames are additionally generated to include a visual representation of all or a portion of the chat transcript 404 (e.g., the agent statements 410 and user statements 406). The video frames and agent speech audio are then used in composing audio and video streams for download, by, e.g., stream composer 522 (716). In certain embodiments, e.g., if the chat transcript is not already represented in the video frames, stream composer 522 may generate a composite video stream including the chat transcript. The download audio and video streams are provided to the endpoint and played at endpoint devices having a display for the video or a speaker for the audio, e.g. via a user interface such as user interface 400 (718). Additionally, any actions generated by the assistant agent 516 are executed.

Figure 8:
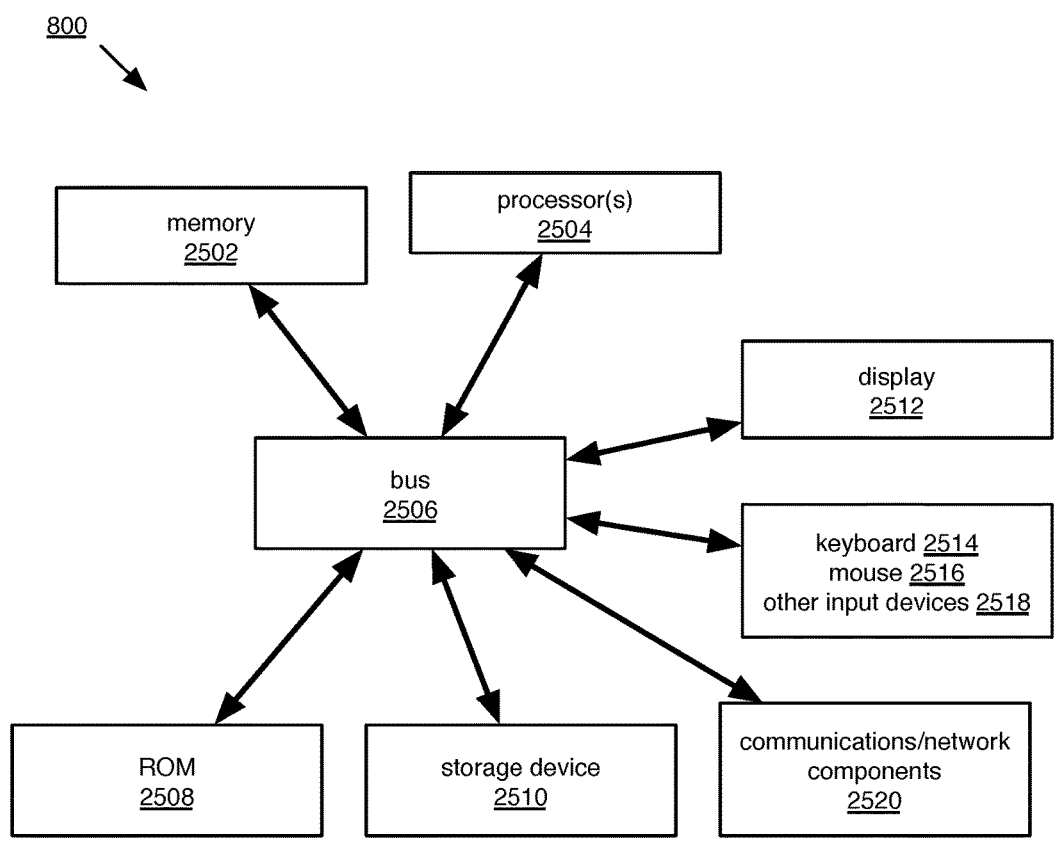
FIG. 8 shows a block diagram of an exemplary computing system in accordance with some embodiments of the invention.

FIG. 8 is a block diagram showing an exemplary computing system 800 that is representative any of the computer systems or electronic devices discussed herein. Note that not all of the various computer systems have all of the features of system 800. For example, systems may not include a display inasmuch as the display function may be provided by a client computer communicatively coupled to the computer system or a display function may be unnecessary.

System 800 includes a bus 2506 or other communication mechanism for communicating information, and a processor 2504 coupled with the bus 2506 for processing information. Computer system 800 also includes a main memory 2502, such as a random-access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 800 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 800 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

Figure 9:
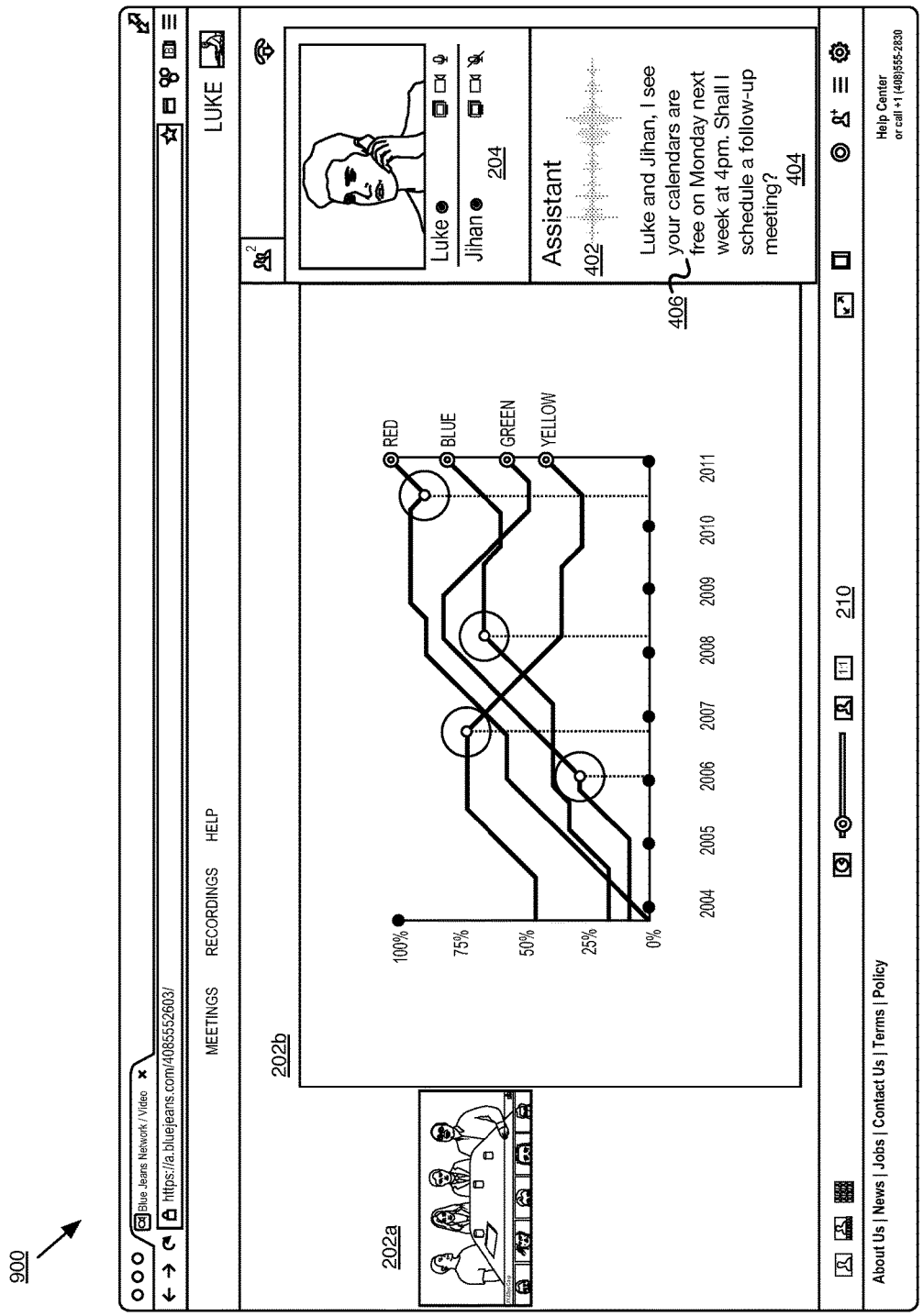
FIG. 9 shows an exemplary in-meeting user interface in accordance with some embodiments of the invention.

FIG. 9 shows an exemplary user interface 900 for participating in a teleconference at an endpoint 106, for example via a display at the endpoint. User interface 900 is similar to user interface 200 shown in FIG. 2, but additionally shows user interface elements representing a virtual assistant and related user interface feedback. For example, user interface 900 includes an agent representation 402 that is an animated visual depiction of a sound waveform representing the assistant's speech, e.g. corresponding to the displayed agent statement 406. In certain embodiments, the agent representation 402 may be an animated figure (see, e.g., representation 402 of FIG. 4), and the representation 402 may come into focus or be highlighted in the user interface to pose a question to the entire group to resolve a conflict. In certain embodiments, the virtual assistant user interface elements do not include an agent representation 402. User interface 900 includes a chat transcript 404 showing a single agent statement 406. In certain embodiments, some or all of the agent statements 406 are provided as audio to the endpoints of the teleconference. In certain embodiments, some or all of the agent statements 406 are provided in displayed text only and are not provided as audio. In certain embodiments, only the last one, two, or three agent statements 406 are shown in the chat transcript 404. In certain embodiments, certain user statements 410 (e.g., user statements provided in response to an agent query) are also shown in the chat transcript 404.

Figure 10:
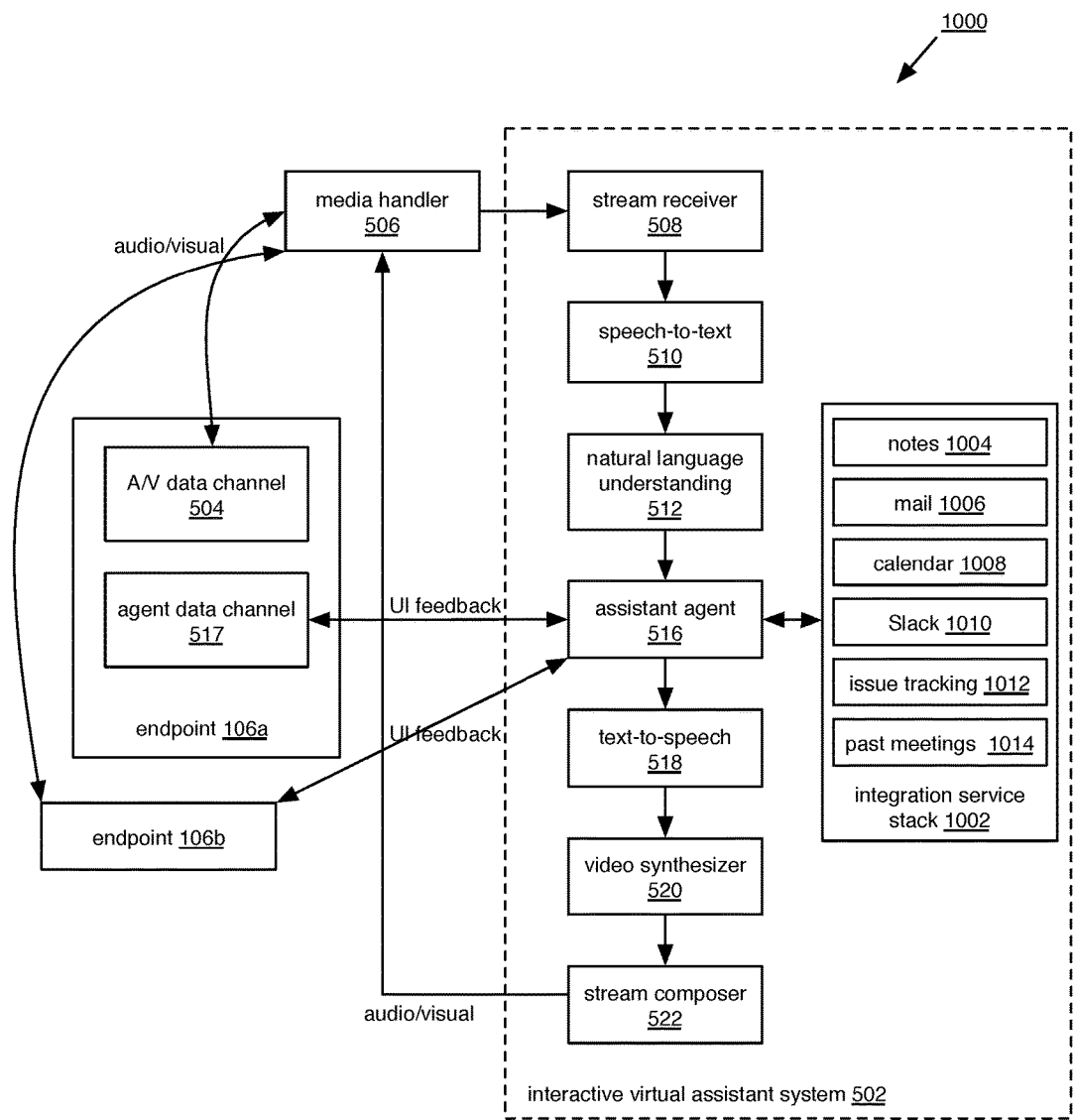
FIG. 10 shows exemplary components of a video conferencing system including an interactive virtual assistant system in accordance with some embodiments of the invention.

FIG. 10 shows components of an exemplary video conferencing system 1000 including an embodiment of interactive virtual assistant system 502 for in-meeting assistance. In certain embodiments, a session is created when one or more endpoints 106, each endpoint associated with one or more participants, connects to a video conferencing meeting. The session may be maintained until all endpoints have disconnected from the meeting.

The components of system 1000 include media handler 506, which receives audio and video streams from respective audio/visual data channels 504 at endpoints 106 (e.g., 106a and 106b), and provides composited media streams for display at the respective endpoints 106. Media handler 506 mediates outgoing and incoming audio/visual streams between the endpoints 106 and the interactive virtual assistant system 502. For example, the media handler 506 can associate each incoming stream with an endpoint or a user account, and accordingly associate a user with each audio stream provided to speech-to-text converter 510.

Incoming audio and video upload streams are provided to stream receiver 508 of the interactive virtual assistant system 502. Stream receiver 508 provides or pushes audio and video streams to particular components of system 502 for further processing and analysis. For example, as shown in FIG. 10, stream receiver 508 may push the audio stream to speech-to-text converter 510. Speech-to-text converter 510 takes an audio stream and generates a corresponding text transcript (e.g., user statements 410). In certain embodiments, each incoming stream from each respective endpoint is processed separately to identify the user statements associated with separate participants or users. In certain embodiments, the converter 510 may be capable of recognizing different speakers/participants speaking in the same audio stream based on a speech recognition algorithm and training data, such that the resulting extracted user statements are associated with a participant identifier (e.g., a user or participant name or ID) corresponding to the speaker. In certain embodiments, the audio streams may be segmented into individual audio segments corresponding to user statements 410 using heuristic rules, such as by identifying a period of silence in a respective audio stream as marking the end of a statement. Such a period of silence indicating the end of a statement may last one second or longer, and the resulting segments of audio may be analyzed to obtain the corresponding text transcript (i.e., the user statement 410). The extracted user statements and corresponding participant identifiers may be provided to NLU processor 512.

Each user statement is analyzed by NLU processor 512 to determine the individual user intent (as distinguished from group intent) and context of each user statement. For example, possible user intents relevant to in-meeting assistance may include scheduling a meeting (e.g., regarding a topic that is context for the intent), preparing and sending a message (in, e.g., email or Slack, concerning, e.g., a summary of the meeting or another topic that is context for the intent), preparing a transcript of or notes regarding the meeting, assigning an action item, raising an issue on an issue tracking system (context defining the issue), or obtaining information regarding any of the above from a previous video conference meeting discussion (context defining the previous meeting or range and desired category of information). The output from the NLU processor 512 (e.g., data items such as the sessionID, user statement/textQuery, user intent name, confidence, contexts, participant identifier) may be provided to the assistant agent 516.

The assistant agent 516 may analyze the group's user statements to identify group intents for the meeting (i.e., validate the presence of potential/target group intents in the session). The assistant agent 516 receives as input structured conversational data from the natural language understanding processor 512 (e.g., detected user intent objects with associated context and participant identifiers), fetches any required information from the integration service stack 1002, and uses this input to determine group intent and take appropriate actions. As used herein, a "group intent" means a user intent shared by at least two members of the group of users participating in a session. The group intent requires more than one participant in the session to indicate agreement regarding an intent.

In certain embodiments, the agent 516 detects group intents and causes corresponding actions to be executed. An approach for detecting group intents may comprise the following steps for validating the presence of a target group intent in a session: The agent 516 tracks each incoming user statement from the incoming audio streams from each endpoint, and creates a corresponding utterance event for each respective user statement 410 extracted from an audio stream. An utterance event includes the following parameters (1) time: the parameter identifying when the user spoke the user statement, (2) user: an identifier for the user or participant who spoke the utterance, (3) user intent: the user intent extracted by the NLU processor 512 based on the user statement, and (4) contexts: the one or more contexts assigned for the user statement and associated context parameters by the NLU processor 512. The time parameter may be, for example, a number identifying a position in a sequence of user statements from the beginning of the conversation, or a time stamp. The user identifier may be a user name, and the user identifier may correspond to a user or participant associated with the endpoint that generated the audio stream.

The agent 516 may maintain each utterance event in a time series data structure, beginning with the first utterance event in the session. The agent 516 may be configured to identify (i.e., validate the presence of) any of a collection of target group intents in the utterance events of the session, using a slot-filling approach. Each target group intent may be associated with (1) one or more responsive actions that will be executed upon validation of the group intent and (2) one or more required-group-intent attributes which are facts or attributes that must all be satisfied or set in order for the agent 516 to determine that the target group intent is validated and the responsive action should be executed. In certain embodiments, a target group intent may be validated if a threshold number or certain pre-defined attributes of the required-group-intent attributes for the target group intent is satisfied or set. Each new utterance event is evaluated to determine if it matches a target group intent—for example, a target group intent may be matched if an utterance event value such as a user intent or a context parameter matches one or more required-group-intent attributes for the target group intent. As used herein, matching an attribute means that the agent has determined that a value in an utterance event meets the required bounds for a target required-group-intent attribute value, or otherwise "fills the slot" for the attribute—for example, the utterance event value may be the same as the searched-for target value, or may meet the requirements to be considered an acceptable target value. For example, the requirements to be considered an acceptable target value may be, e.g., a requirement that the value be within a certain range of integers, or a requirement that a value be a member of a list of possible parameter values. In another example, the requirements to be considered an acceptable target value may require the presence or absence of a combination of parameter values, such as a certain user intent as well as the presence of a certain active context parameter or entity and/or the absence of a certain context parameter or entity. In certain embodiments, an attribute is matched if a certain user intent is present. In certain embodiments, a target group intent is validated where the required-group-intent attributes specify the condition that a certain user intent is identified for two or more participants (i.e., the two or more participants are in agreement with respect to the intent). In certain embodiments, utterance events may be evaluated to determine if they match a target user intent, in which a responsive action may be performed without requiring agreement between two or more participants.

At any time during the session, if a target group intent is matched and validated, the agent 516 will cause the responsive action to be executed. If any required-group-intent attributes for the target group intent is missing/unmatched, the agent will search for each of the attributes in the previous N utterance events (e.g., by evaluating whether any of the previous N utterance event values match any of the missing required-group-intent attributes, where N is an integer). If the any of the required-group-intent attributes for the target group intent are still missing, then agent 516 will wait for one or more of the next M utterance events to match the missing attributes, and accordingly search for the missing attributes in each successive utterance event until the Mth event has been searched or the missing attribute has been matched in an event (e.g., where M is an integer). In certain embodiments, N and M are configurable parameters for target group intents based on the corresponding responsive actions. For example, if the target group intent is scheduling a meeting, the values of N and M will be lower (e.g., ten or fewer), because there is a high probability that the group will try to decide upon a time and date for the meeting immediately. In another example, if the target group intent is creating a new issue for an issue tracking service, the values of N and M may be higher (e.g., 20 or greater), because there is a high probability that the particular issue may be discussed for a long time.

A confidence measure for evaluating the likelihood that the target group intent is valid may be determined based on the respective user intent confidence values provided by the NLU processor 512—for example, the group intent confidence measure may be a product of the constituent user intent confidences (e.g., where a match of user intents from two or more participants are required-group-intent attributes). In another example, the target group intent confidence measure may be determined based a threshold number concerning the number of group intent attributes that are satisfied. In certain embodiments, as a default rule, the agent will cause a responsive action to be executed if the group intent confidence is higher than a threshold parameter. If the confidence level for the validity of the inferred target group intent is below a threshold parameter, the agent may generate an agent statement prompt to obtain confirmation from one or more users before causing the responsive action to be executed. For example, if the group intent confidence measure for a responsive action is low (e.g., <0.5), then the agent 516 may generate an agent statement 406 that prompts for confirmation from the group of users in the meeting. If the confidence level for a candidate action is high, then the agent may generate the action and cause it to be executed, and one or more of the endpoints 106 may be notified of the action via the respective data channel 504 (e.g., via an agent statement 406 describing the action that is displayed and/or corresponding speech audio played via user interface 900). In certain embodiments, the agent will recognize whether the responsive action was canceled or reverted by a user of the session after causing the responsive action to be executed, and the confidence threshold parameter for the target group intent will be automatically adjusted to a more stringent value, so that during the same session the agent must have a higher confidence in order to determine that the target group intent is valid. In certain embodiments, the adjusted confidence threshold value is recorded in persistent storage (e.g., via past meetings service 1014), and upon recurrence of a corresponding meeting (e.g., having the same or similar user participants) at a later date, the agent will obtain the updated confidence threshold value (and any others), and the updated value will be used for the target group intent.

In certain embodiments, if the past N utterance events and future M utterance events are not enough to fill the slots for all of the required-group-intent attributes for the target group intent, then the agent 516 may (1) seek the information for the missing attributes via a data query provided to the integration service stack 1002 or (2) generate an agent statement 406 that is a prompt for information about one or more of the missing required-group-intent attributes. For example, the agent 516 may provide a query for the value for the missing required-group-intent attribute to the integration service stack 1002, or may request more general information and process the received information to determine a value for the missing required-group-intent attribute. In another example, the agent statement may ask the meeting participants for a missing attribute value, and the agent may search for the missing attribute value in the next N utterance events, where the value N may be a configurable parameter for the target group intent.

After the target group intent has been validated by the agent 516, the agent 516 will cause the target group intent's responsive action to be executed. Causing an action to be executed may comprise one or more of: (1) notifying one or more of the endpoints 106 about the action via the respective agent data channels 517 (i.e., constituting user interface feedback via, for example, user interface 900, which may be a displayed agent statement 406 and/or a spoken agent statement), (2) fetching and analyzing information from the integration service stack 1002 (e.g., executing a data query), and (3) providing instructions to modify data or records in the integration service stack 1002. More specific examples of causing an action to be executed are provided below.

Table 1 shows an exemplary sequence of user statements 410, agent statements 406, and the corresponding utterance events and actions generated by agent 516 during a session. In this example, two users indicate a user intent to schedule a meeting. The agent matches and validates the intent to schedule a meeting as a group intent and schedules a follow-up meeting via a calendar service 1008 of integration service stack 1008. In this example, the user intent may include multiple attributes (e.g., schedule_meeting.start and answer_yes) that may be used to set required-group-intent attributes (i.e., to parameterize the attributes by providing them with values obtained via the utterance events or analysis of the utterance events).

TABLE 1

| (User or agent): statement | Utterance event and attributes or Action |
| --- | --- |
| 1. (Eve): Alice, I think we should sync up again. | Event1 = {time = 0, intent = schedule_meeting.start, user = Eve, contexts = (nil)} |
| 2. (Alice): Yes, I think we should. | Event2 = {time = 1, intent = schedule_meeting.answer_yes, user = Alice, contexts = (schedule_meeting)} |
| 3. (Eve): Should we meet next week some time? | Event3 = {time = 2, intent = schedule_meeting.answer_time, user = Eve, contexts = (schedule_meeting, schedule_meeting.schedule = '1-7 Oct')} |
| 4. (Alice): Yes, Monday 4 PM next week will be good. | Event4 = {time = 3, intent = schedule_meeting.confirmed, user = Alice, contexts = (schedule_meeting, schedule_meeting.schedule = '1 Oct, 4 PM Monday')} |
| 5. (Agent): I have scheduled a meeting for Monday at 4 PM next week. | Action = integration services stack (calendar service)-> create meeting for Alice, Eve; notify endpoints with agent statement re: new meeting |

Table 2 shows a second exemplary sequence of user statements 410, agent statements 406, and the corresponding utterance events and actions generated by agent 516 during a session. In this example, the group agrees that a meeting should be scheduled, but the users only discuss a general time frame for the meeting. Accordingly, required-group-intent attribute schedule_meeting.schedule is outside the required bounds (it specifies a date range rather than a single date and time), so the agent queries a calendar service 1008 of integration service stack 1008 to obtain the availability of each user, and analyzes the availability data to obtain a proposed date and time for the follow-up meeting when both users are available to fill the missing slot (i.e., the missing required-group-intent attribute is set to a value that is within the required bounds). In this example, because the agent has suggested a proposed time, the confidence level for the group intent is below a threshold for simply executing the responsive action for the group intent (here, scheduling a meeting), so the agent generates an agent statement prompt to obtain confirmation prior to scheduling the meeting.

TABLE 2

| (User or agent): statement | Utterance event and attributes or Action |
| --- | --- |
| 1. (Eve): Alice, I think we should sync up again. | Event1 = {time = 0, intent = schedule_meeting.start, user = Eve, contexts = (nil)} |
| 2. (Alice): Yes, I think we should. | Event2 = {time = 1, intent = schedule_meeting.answer_yes, user = Alice, contexts = (schedule_meeting)} |
| 3. (Eve): Should we meet next week some time? | Event3 = {time = 2, intent = schedule_meeting.answer_time, user = Eve, contexts = (schedule_meeting, schedule_meeting.schedule = '1-7 Oct')} |
| 4. (Alice): Sure. | Event4 = {time = 3, intent = schedule_meeting.yes_time_waiting, user = Alice, contexts = (schedule_meeting, schedule_meeting.schedule = '1-7 Oct')} |

TABLE 2-continued

| (User or agent): statement | Utterance event and attributes or Action |
|---|---|
| 5. (Agent): Hey Alice and Eve, I see that your calendars are free on Monday next week at 4 PM. Shall I schedule a meeting at that time? | Action = integration services stack (calendar service)-> get availability for '1-7 Oct', users Alice, Eve; determine common available time, and choose first time; notify endpoints with agent statement query re: new meeting time |
| 6. (Eve): Yes | Event5 = {time = 4, intent = schedule_meeting.confirmed, user = Alice, contexts = (schedule_meeting, schedule_meeting.schedule = '1 Oct, 4 PM Monday')} |
| 7. (Agent): I have scheduled a meeting for Monday at 4 PM next week. | Action = integration services stack (calendar service)-> create meeting for Alice, Eve; notify endpoints with agent statement re: new meeting |

Table 3 shows an exemplary sequence of user statements 410, agent statements 406, and the corresponding utterance events and actions generated by agent 516 during a session. In this example, a group of three users indicates an intent to create an action item and hold a follow-up meeting. The agent identifies the group intent, adds the action item, schedules a follow-up meeting via a calendar service 1008 of integration service stack 1008, and sends out a summary email after the session ends. In certain embodiments, the agent may be configured to send out a summary email by the agent recognizing this preference based on past behavior and recording such a preference in a component of the integration service stack (e.g., in one or more previous meetings having the same participants, the group requested that a summary email be sent).

TABLE 3

| (User or agent): statement | Utterance event and attributes or Action |
|---|---|
| 1. (Alice): Hi everyone, let's discuss the last quarter sales figures. | Event1 = {time = 0, intent = nil, user = Alice, contexts = (nil)} |
| 2. (Bob): Sure, Alice, let me share it on the screen. | Event2 = {time = 1, intent = nil, user = Bob, contexts = (nil)} |
| 3. (Alice): We have to increase our marketing to improve the sales. Eve, can you please take an action item to pull together a marketing campaign. | Event3 = {time = 2, intent = add_action_item, user = Alice, contexts = (user: Eve, item: "pull together a marketing campaign")} |
| 4. (Agent): (Text in UI) Action item added for Eve. This action item will also be mailed at the end of the meeting. | Action = add action item; note that in some embodiments this would add an item in, e.g., an action item panel in the UI |
| 5. (Eve): Sure Alice - I think we should sync up again next Monday to discuss the campaign. | Event4 = {time = 3, intent = schedule_meeting.start, user = Eve, contexts = (schedule_meeting, schedule_meeting.schedule = '20 Nov')} |
| 6. (Agent): (Voice prompt) Should I schedule a follow-up meeting on Monday? | Action = notify endpoints with agent statement query re: meeting time |
| 7. (Alice): Yes, please. | Event5 = {time = 4, intent = schedule_meeting.confirmed, user = Alice, contexts = (schedule_meeting, schedule_meeting.schedule = '20 Nov')} |
| 8. (Agent): (Text in UI): I have scheduled a follow-up meeting on Monday, November 20 at | Action = integration services stack (calendar service)-> create meeting for Alice, Eve, Bob; notify endpoints with agent statement re: new meeting |

TABLE 3-continued

| (User or agent): statement | Utterance event and attributes or Action |
|---|---|
| 10 AM inviting all participants. | |
| 9. (Alice): Thanks everyone, let's meet again next Monday. | Event6 = {time = 5, intent = nil, user = Alice, contexts = (nil)} |
| 10. (Agent): (Text in UI): Action items and a summary of the meeting have been sent to all participants. | Action = integration services stack (notes service)->generate meeting summary; integration services stack (mail service)->send meeting summary, action items to Alice, Eve, Bob |

As part of the process of detecting group intents and causing responsive actions to be executed, the agent 516 may obtain information from the integration service stack 1002 via data queries provided to its components, and provide instructions to modify data or records in components of the integration service stack. The integration service stack is a collection of services; the services may be hosted local to one or more of the users (e.g., on an enterprise network) or may be hosted by a remote cloud-based service (e.g., part of video conferencing system server components 102 or as an external third-party service), or a mixture of both. Integration service stack 1002 provides an API interface to each respective component service for executing data queries and updating data at the component services. The component services may include a notes service 1004 for, e.g., maintaining meeting notes in a persistent storage; a mail service 1006 for sending emails; a calendar service 1008 for fetching calendar details for a user or scheduling an event, such as a video conference meeting, for one or more users; a Slack service 1010 for sending Slack messages to a meeting participant; an issue tracking service 1012 for fetching information about a particular issue or raising an issue/ticket; a past meetings service 1014 for searching through the content of past meetings, such as video recordings, and transcripts documenting the meeting, or for obtaining participant information (e.g., the users associated with the meeting, or the users who spoke during the meeting). In certain embodiments, different or additional services are provided via the integration service stack. Each service may include appropriate persistent data storage and methods for operating on the stored data, such as retrieving data, updating data, and creating new records.

For example, a user may express an intent to take meeting notes, or to create a summary of the meeting. Depending on the particular user intent (e.g., a desire for a transcript, take notes regarding a keyword, or a summary of the session), the agent may cause, as a responsive action, the notes service 1004 to save a transcript of the session, save a transcript of utterances including the keyword, or automatically summarize the transcript using, e.g., entropy-based summarization, and save the results of the summarization. In certain embodiments, notes services may be executed in response to a group intent regarding transcripts, notes, or a summary.

For example, a target group intent relevant to sending a mail message may be the assignment of an action item to a particular user, in which the responsive action is to generate and send a mail message using mail service 1006 after the session ends to all users including a listing of each action item and the assigned user. To assemble the action item list, the agent 516 compiles a list of action items, adding each new action item to the list as it is discussed by the meeting participants during the session.

In another example, a target group intent relevant to a person missing from the current video conference (e.g., participants might name a person who should be a part of the conversation but is not a current participant). The group intent may be an ad hoc invite, and required-group-intent attributes would include the name of the user to invite. The responsive action upon validating the group intent would be to create and send a teleconference invite message using email (via mail service 1006), a text message, or Slack (service 1010).

In another example, a target group intent relevant to tracking an issue may be the participants indicating a need to track a new issue, in which case the agent may create a new issue and issue identifier with a description derived from the user discussion (e.g., obtained from utterance event contexts) via the issue tracking service 1012. In another example, a target group intent may be to close an issue, which upon identification of the issue as stored in the issue tracking service 1012 and validation would cause the agent to close the issue. For example, the corresponding target group intent would be to close an issue or close a ticket, and the required-group-intent attributes would be at least one of a ticket ID or ticket label. The responsive action would be to close the ticket via the issue tracking service 1012.

In certain embodiments, services of stack 1002 may be used in combination by the agent—for example, in response to a detected group intent regarding a need to review a portion of a prior presentation, the agent may validate the group intent upon inferring a description of the portion of the presentation from utterance event contexts (where a description of the portion may be extracted by NLU processor 512 from a user statement such as "the first 15 minutes of the Jul. 6, 2017 board call"), obtain the corresponding portion of a video recording from the past meetings service 1014 and email it to a particular user as an email attachment via mail service 1006. In another embodiment, the group intent may be to review prior discussions of a project called Widget (e.g., with context extracted by NLU processor 512 from a user statement such as "let's review the specs for Project Widget from last month"); accordingly, the agent 516 may cause a search of indexed recordings in the past meetings service 1014 using the context keywords "Project Widget" in the indexed recordings of service 1014, and may present the search results to the meeting participants. For example, a summary generated based on the search results can be presented to all participants in a side panel or window. The summary may include transcribed text, playable audio, or a video. In one example, a short 30-second summary video may be presented which will be played at each participant's endpoint, in sync across all endpoints, in a side panel.

During the process of validating a group intent, the agent 516 may generate an agent statement, e.g., a prompt for additional information. Upon validation of a group intent, the agent may generate an appropriate agent statement, e.g., notifying the meeting participants of responsive actions that the agent has caused to be executed or that will be executed. In certain embodiments, such agent statements 406 are provided directly to endpoints 106 via respective agent data channels 517, in the case where the agent statements 406 are merely displayed in a user interface at the endpoints such as UI 900. Such agent statements 406 may in certain embodiments be provided to text-to-speech converter 518 (e.g., converter 518 will convert the agent statement to audio if the agent statement 406 should be spoken and not merely displayed in a user interface such as UI 900). Audio output representing agent statement 406 from text-to-speech converter 518 and/or agent statements 406 as text may in certain embodiments be provided to video synthesizer 520, in order to generate frames of a video representing a visual agent representation 402, which in turn are provided to stream composer 522 for composing audio and video streams. In certain embodiments, audio output representing agent statement 406 from text-to-speech converter 518 is provided directly to stream composer 522, which composes an audio stream. Audio and/or video streams are provided to media handler 506, which sends the outgoing media streams to the respective endpoints of the meeting.

Figure 11:
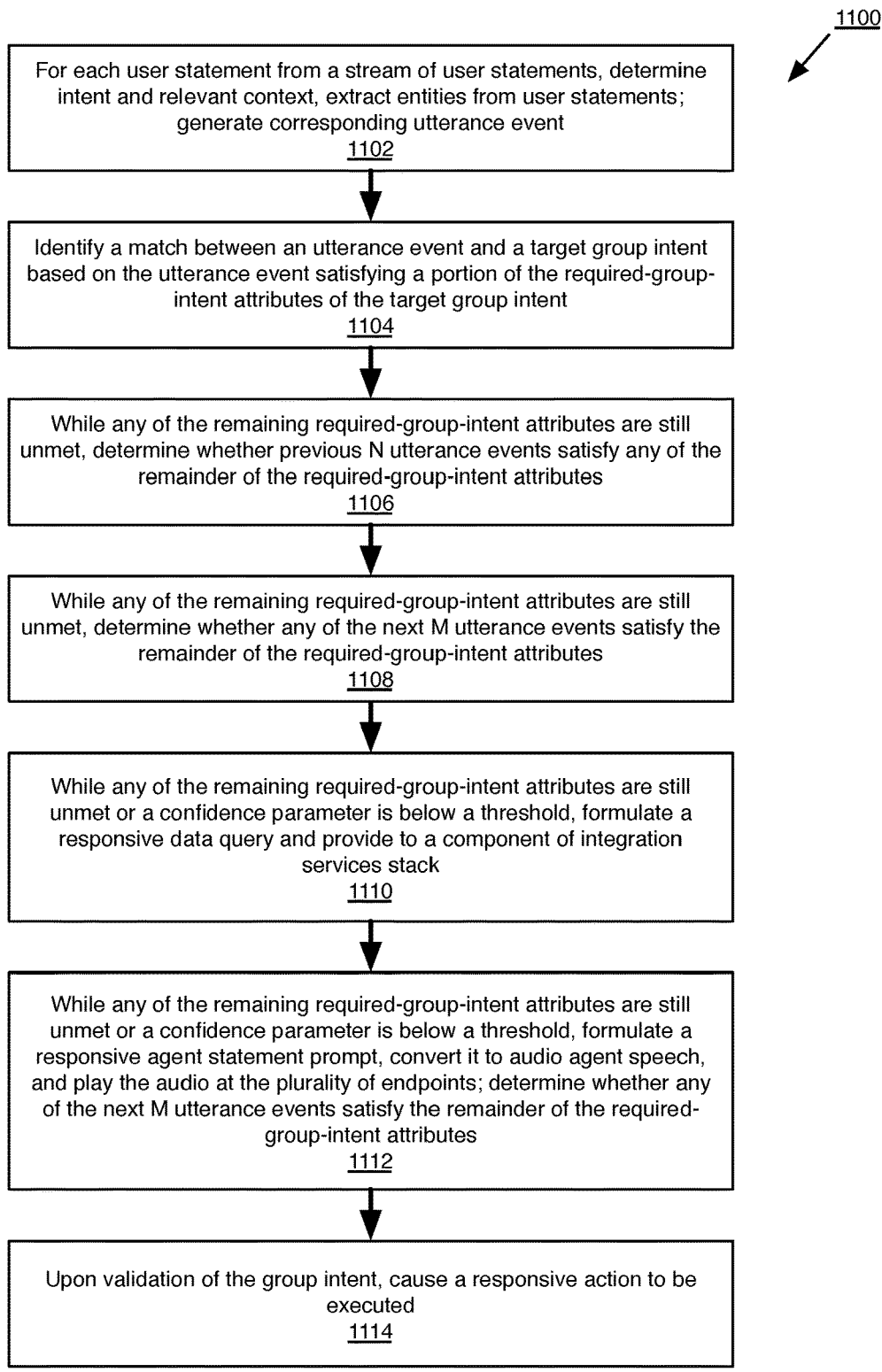
FIG. 11 shows a flow chart for an exemplary process concerning providing in-meeting assistance by virtual assistant responsive to group intent during a video conference, in accordance with some embodiments of the invention.

FIG. 11 shows a flow chart for an exemplary process 1100 concerning providing in-meeting assistance by a virtual assistant responsive to group intent during a video conference meeting. The video conference meeting may involve a plurality of participants at a plurality of conference endpoints. At each endpoint of the plurality of endpoints, an upload audio stream may be generated via data from an endpoint microphone. Each upload audio stream, e.g., including the audio speech of respective users associated with the endpoints, is provided to a media handler 506 and/or a virtual assistant 502 for in-meeting assistance based on group intent analysis of the audio streams. Each audio stream may be converted to text (e.g., via speech-to-text converter 510), resulting in a corresponding stream of user statements. In an initial step, user statements are extracted from upload audio streams, and analyzed to determine user intent and relevant contexts, e.g., using NLU processor 512 (1102). Each user statement is used to create a corresponding utterance event. Each utterance event is analyzed to identify any matches between the utterance event and a target group intent, where matches are found when a required-group-intent attribute of the target group intent corresponds to a component of the utterance event, such as the user intent or context (1104). In certain embodiments, validation of the group intent causes execution of an action associated with the target group intent, and the group intent is not validated until all of the required-group-intent attributes are satisfied. Accordingly, while remaining required-group-intent attributes are not satisfied, an agent 516 may analyze the previous N utterance events to attempt to parameterize the remaining required-group-intent attributes based on those prior utterance events (1106). If, after step 1106, any required-group-intent attributes are still not satisfied, the agent may perform one or more of: (a) waiting for up to the next M utterance events, and using these future utterance events to attempt to parameterize the remaining required-group-intent attributes (1108), (b) formulating a data query to seek the missing required-group-intent attributes from service available via an integration service stack 1002, and using the received data to attempt to parameterize the remaining required-group-intent attributes (1110), and (c) formulating a responsive agent statement that is a prompt for information that will allow the agent to parameterize the remaining required-group-intent attributes, and then monitoring the following M utterance events to attempt to parameterize the remaining required-group-intent attributes based on those prior utterance events (1112). In certain embodiments, if the target-group-intent confidence is below a threshold, the agent may formulate a responsive agent statement that is a prompt for confirming that the responsive action should be executed. Once the target group intent is validated by meeting each of the associated required-group-intent attributes (or in certain embodiments, a required subset of the attributes), the agent will cause a responsive action associated with the target group intent to be executed (1114). In certain embodiments, the responsive action may be reported to meeting participants via user interface feedback. In certain embodiments, responsive actions may be methods associated with components of an integration service stack 1002.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for identifying and handling group intent in a video conference using a virtual agent, the method comprising:

receiving two or more upload audio streams generated at two or more endpoints of a video conferencing system;

converting the two or more upload audio streams to a plurality of text-user statements;

determining one or more user-intent names and a corresponding one or more user-context parameters based on one or more of the text-user statements;

creating a plurality of utterance events based on the plurality of text-user statements, wherein the respective utterance events comprise the respective user-intent names;

identifying a match between a first utterance event of the plurality of utterance events and a target group intent having a predefined set of required-group-intent attributes, wherein the match is based on the utterance event satisfying a portion of the set of required-group-intent attributes, and wherein satisfying all of the required-group-intent attributes includes identifying a user intent shared by at least two participants in the video conference;

determining whether a component of a respective event of a first count of previous utterance events from the plurality of utterance events satisfies a first unsatisfied required-group-intent attribute, and parameterizing the first unsatisfied required-group-intent attribute if so;

determining whether a component of a respective event of a second count of additional utterance events satisfies the first or a second unsatisfied required-group-intent attribute, and parameterizing one or more of the first and second unsatisfied required-group-intent attributes if so;

formulating a responsive data query concerning the first, second, or a third unsatisfied required-group-intent attribute;

providing the responsive data query to an integration service stack, wherein the integration service stack provides an application programming interface for a collection of constituent services;

formulating a responsive agent statement prompt concerning the first, second, third, or a fourth unsatisfied required-group-intent attribute;

converting the responsive agent statement prompt to audio for playing at one or more of the endpoints;

determining whether a component of a respective event of a third count of additional utterance events satisfies the first, second, third, or fourth unsatisfied required-group-intent attribute, and parameterizing one or more of the first, second third and fourth unsatisfied required-group-intent attributes if so;

upon validation of the target group intent, causing a responsive action to be executed, wherein validation is achieved when all of the required-group-intent attributes are satisfied.

2. The method of claim 1, wherein validation of the target group intent further comprises:

determining a target-group-intent confidence based on a status of the required-group-intent attribute values;

if the target-group-intent confidence is below a group-intent-confidence threshold:

formulating a responsive agent statement prompt requesting confirmation of the responsive action;

converting the responsive agent statement prompt to audio for playing at one or more of the endpoints;

determining whether a component of a respective event of a fourth count of additional utterance events includes a user intent to confirm the responsive action, and determining that the target group intent is valid if so;

otherwise, determining that the target group intent is not valid.

3. The method of claim 1, wherein causing a responsive action to be executed comprises one or more of (1) formulating a responsive agent statement notification regarding the action for display at one or more of the endpoints; (2) formulating and providing an action-associated data query to the integration service stack; and (3) formulating and providing instructions to modify data or records of a service via the integration service stack.

4. The method of claim 1, wherein each respective utterance event comprises: a time parameter identifying when a user spoke the text-user statement, an identifier for the user, the user-intent name, and a context parameter.

5. The method of claim 1, further comprising: receiving an organization associated with one or more users participating in the video conference, wherein the step of identifying a match between a first utterance event of the plurality of utterance events and a target group intent uses a domain-specific learning module that is associated with the organization.

6. The method of claim 1, wherein the collection of constituent services of the integration service stack includes two or more of: a notes service, a mail service, a calendar service, a Slack service, an issue tracking service, and a past meetings service.

7. The method of claim 1, wherein the target group intent is an ad hoc invite, the required-group-intent attributes include a name of the user to invite, and the responsive action comprises creating and sending a teleconference invite message to the user to invite.

8. A video conferencing system, comprising:

one or more processors;

one or more storage devices communicatively coupled to the one or more processors; and instructions on the one or more storage devices that, when executed by the one or more processors, cause the one or more processors to:

receive two or more upload audio streams generated at two or more endpoints of a video conferencing system;

convert the two or more upload audio streams to a plurality of text-user statements;

determine one or more user-intent names and a corresponding one or more user-context parameters based on one or more of the text-user statements;

create a plurality of utterance events based on the plurality of text-user statements, wherein the respective utterance events comprise the respective user-intent names;

identify a match between a first utterance event of the plurality of utterance events and a target group intent having a predefined set of required-group-intent attributes, wherein the match is based on the utterance event satisfying a portion of the set of required-group-intent attributes, and wherein satisfying all of the required-group-intent attributes includes identifying a user intent shared by at least two participants in the video conference;
determine whether a component of a respective event of a first count of previous utterance events from the plurality of utterance events satisfies a first unsatisfied required-group-intent attribute, and parameterize the first unsatisfied required-group-intent attribute if so;
determine whether a component of a respective event of a second count of additional utterance events satisfies the first or a second unsatisfied required-group-intent attribute, and parameterize one or more of the first and second unsatisfied required-group-intent attributes if so;
formulate a responsive data query concerning the first, second, or a third unsatisfied required-group-intent attribute;
provide the responsive data query to an integration service stack, wherein the integration service stack provides an application programming interface for a collection of constituent services;
formulate a responsive agent statement prompt concerning the first, second, third, or a fourth unsatisfied required-group-intent attribute;
convert the responsive agent statement prompt to audio for playing at one or more of the endpoints;
determine whether a component of a respective event of a third count of additional utterance events satisfies the first, second, third, or fourth unsatisfied required-group-intent attribute, and parameterize one or more of the first, second, third and fourth unsatisfied required-group-intent attributes if so;
upon validation of the target group intent, cause a responsive action to be executed, wherein validation is achieved when all of the required-group-intent attributes are satisfied.

9. The system of claim 8, wherein validation of the target group intent further comprises:
determine a target-group-intent confidence based on a status of the required-group-intent attribute values;
if the target-group-intent confidence is below a group-intent-confidence threshold:
  formulate a responsive agent statement prompt requesting confirmation of the responsive action;
  convert the responsive agent statement prompt to audio for playing at one or more of the endpoints;
  determine whether a component of a respective event of a fourth count of additional utterance events includes a user intent to confirm the responsive action, and determine that the target group intent is valid if so;
otherwise, determine that the target group intent is not valid.

10. The system of claim 8, wherein cause a responsive action to be executed comprises one or more of (1) formulate a responsive agent statement notification regarding the action for display at one or more of the endpoints; (2) formulate and provide an action-associated data query to the integration service stack; and (3) formulate and provide instructions to modify data or records of a service via the integration service stack.

11. The system of claim 8, wherein each respective utterance event comprises: a time parameter identifying when a user spoke the text-user statement, an identifier for the user, the user-intent name, and a context parameter.

12. The system of claim 8, further comprising instructions that cause the one or more processors to: receive an organization associated with one or more users participating in the video conference, wherein the step of identify a match between a first utterance event of the plurality of utterance events and a target group intent uses a domain-specific learning module that is associated with the organization.

13. The system of claim 8, wherein the collection of constituent services of the integration service stack includes two or more of: a notes service, a mail service, a calendar service, a Slack service, an issue tracking service, and a past meetings service.

14. The system of claim 8, wherein the target group intent is an ad hoc invite, the required-group-intent attributes include a name of the user to invite, and the responsive action comprises creating and sending a teleconference invite message to the user to invite.

15. A non-transitory machine-readable storage medium comprising instructions that, when executed by a processor, cause the processor to:
receive two or more upload audio streams generated at two or more endpoints of a video conferencing system;
convert the two or more upload audio streams to a plurality of text-user statements;
determine one or more user-intent names and a corresponding one or more user-context parameters based on one or more of the text-user statements;
create a plurality of utterance events based on the plurality of text-user statements, wherein the respective utterance events comprise the respective user-intent names;
identify a match between a first utterance event of the plurality of utterance events and a target group intent having a predefined set of required-group-intent attributes, wherein the match is based on the utterance event satisfying a portion of the set of required-group-intent attributes, and wherein satisfying all of the required-group-intent attributes includes identifying a user intent shared by at least two participants in the video conference;
determine whether a component of a respective event of a first count of previous utterance events from the plurality of utterance events satisfies a first unsatisfied required-group-intent attribute, and parameterize the first unsatisfied required-group-intent attribute if so;
determine whether a component of a respective event of a second count of additional utterance events satisfies the first or a second unsatisfied required-group-intent attribute, and parameterize one or more of the first and second unsatisfied required-group-intent attributes if so;
formulate a responsive data query concerning the first, second, or a third unsatisfied required-group-intent attribute;
provide the responsive data query to an integration service stack, wherein the integration service stack provides an application programming interface for a collection of constituent services;
formulate a responsive agent statement prompt concerning the first, second, third, or a fourth unsatisfied required-group-intent attribute;
convert the responsive agent statement prompt to audio for playing at one or more of the endpoints;
determine whether a component of a respective event of a third count of additional utterance events satisfies the first, second, third, or fourth unsatisfied requiredgroup-intent attribute, and parameterize one or more of the first, second, third and fourth unsatisfied required-group-intent attributes if so;

upon validation of the target group intent, cause a responsive action to be executed, wherein validation is achieved when all of the required-group-intent attributes are satisfied.

16. The non-transitory machine-readable storage medium of claim 15, wherein validation of the target group intent further comprises:

determine a target-group-intent confidence based on a status of the required-group-intent attribute values;

if the target-group-intent confidence is below a group-intent-confidence threshold:

formulate a responsive agent statement prompt requesting confirmation of the responsive action;

convert the responsive agent statement prompt to audio for playing at one or more of the endpoints;

determine whether a component of a respective event of a fourth count of additional utterance events includes a user intent to confirm the responsive action, and determine that the target group intent is valid if so;

otherwise, determine that the target group intent is not valid.

17. The non-transitory machine-readable storage medium of claim 15, wherein cause a responsive action to be executed comprises one or more of (1) formulate a responsive agent statement notification regarding the action for display at one or more of the endpoints; (2) formulate and provide an action-associated data query to the integration service stack; and (3) formulate and provide instructions to modify data or records of a service via the integration service stack.

18. The non-transitory machine-readable storage medium of claim 15, wherein each respective utterance event comprises: a time parameter identifying when a user spoke the text-user statement, an identifier for the user, the user-intent name, and a context parameter.

19. The non-transitory machine-readable storage medium of claim 15, further comprising instructions that cause the processor to: receive an organization associated with one or more users participating in the video conference, wherein the step of identify a match between a first utterance event of the plurality of utterance events and a target group intent uses a domain-specific learning module that is associated with the organization.

20. The non-transitory machine-readable storage medium of claim 15, wherein the collection of constituent services of the integration service stack includes two or more of: a notes service, a mail service, a calendar service, a Slack service, an issue tracking service, and a past meetings service.

* * * * *